United States Patent
Takahashi

(10) Patent No.: US 11,750,571 B2
(45) Date of Patent: Sep. 5, 2023

(54) MULTI-INDEPENDENT LEVEL SECURE (MILS) STORAGE ENCRYPTION

(71) Applicant: SECTURION SYSTEMS, INC., Centerville, UT (US)

(72) Inventor: Richard J. Takahashi, Layton, UT (US)

(73) Assignee: SECTURION SYSTEMS, INC., Centerville, UT (US)

(*) Notice: Subject to any disclaimer, the term of this patent is extended or adjusted under 35 U.S.C. 154(b) by 359 days.

(21) Appl. No.: 16/889,365

(22) Filed: Jun. 1, 2020

(65) Prior Publication Data
US 2021/0119979 A1 Apr. 22, 2021

Related U.S. Application Data

(63) Continuation of application No. 15/332,059, filed on Oct. 24, 2016, now Pat. No. 10,708,236.
(Continued)

(51) Int. Cl.
*H04L 29/06* (2006.01)
*H04L 9/40* (2022.01)
(Continued)

(52) U.S. Cl.
CPC ........ *H04L 63/0428* (2013.01); *H04L 9/0819* (2013.01); *H04L 9/0894* (2013.01);
(Continued)

(58) Field of Classification Search
CPC . H04L 63/0428; H04L 9/0819; H04L 9/0894; H04L 9/14; H04L 45/00;
(Continued)

(56) References Cited

U.S. PATENT DOCUMENTS 4,319,079 A 3/1982 Best
4,357,529 A 11/1982 Atalia
(Continued)

FOREIGN PATENT DOCUMENTS

EP 2337304 6/2011
EP 3350974 7/2018
(Continued)

OTHER PUBLICATIONS

Vasyltsov et al.; Fast Digital TRNG Based on Metastable Ring Oscillator; 17 pages; Samsung Electronics; Korea.
(Continued)

*Primary Examiner* — Harunur Rashid
(74) *Attorney, Agent, or Firm* — Greenberg Traurig LLP

(57) ABSTRACT

In one embodiment, a method includes: receiving, by a first computing device on a first port of a plurality of ports, a data packet, wherein each of the ports corresponds to one of a plurality of security classes, and the first computing device comprises a plurality of cryptographic modules, each module configured to encrypt data for a respective one of the security classes; tagging the data packet, wherein tagging data identifies one of the security classes and the first port; routing, based on at least one header, the data packet to a first cryptographic module of the plurality of cryptographic modules; encrypting the data packet using the first cryptographic module; and storing the encrypted data packet in a first data storage device.

20 Claims, 19 Drawing Sheets

Related U.S. Application Data

(60) Provisional application No. 62/246,299, filed on Oct. 26, 2015.

(51) Int. Cl.
*H04L 9/08* (2006.01)
*H04L 45/00* (2022.01)
*H04L 9/14* (2006.01)
*H04L 69/22* (2022.01)

(52) U.S. Cl.
CPC ............... *H04L 9/14* (2013.01); *H04L 45/00* (2013.01); *H04L 63/0227* (2013.01); *H04L 63/105* (2013.01); *H04L 69/22* (2013.01); *H04L 63/126* (2013.01)

(58) Field of Classification Search
CPC ... H04L 63/0227; H04L 63/105; H04L 69/22; H04L 63/126; H04L 45/74
See application file for complete search history.

(56) References Cited

U.S. PATENT DOCUMENTS

| | | | |
|---|---|---|---|
| 5,594,797 A | 1/1997 | Alanara et al. | |
| 5,602,916 A | 2/1997 | Grube | |
| 5,892,962 A | 4/1999 | Cloutier | |
| 5,915,025 A | 6/1999 | Taguchi et al. | |
| 5,961,626 A | 10/1999 | Harrison et al. | |
| 5,995,628 A | 11/1999 | Kitaj et al. | |
| 6,044,388 A | 3/2000 | DeBellis et al. | |
| 6,081,895 A | 6/2000 | Harrison et al. | |
| 6,101,255 A | 8/2000 | Harrison et al. | |
| 6,128,666 A | 10/2000 | Muller et al. | |
| 6,304,973 B1 | 10/2001 | Williams | |
| 6,351,813 B1 | 2/2002 | Mooney | |
| 6,378,072 B1 | 4/2002 | Collins | |
| 6,515,993 B1 | 2/2003 | Williams et al. | |
| 6,550,012 B1 | 4/2003 | Villa et al. | |
| 6,577,734 B1 | 6/2003 | Etzel et al. | |
| 6,598,161 B1 | 7/2003 | Kluttz et al. | |
| 6,715,028 B1 | 3/2004 | Toda | |
| 6,845,446 B1 | 1/2005 | Fuller | |
| 7,171,000 B1 | 1/2007 | Toh et al. | |
| 7,200,756 B2 | 4/2007 | Griffin et al. | |
| 7,277,941 B2 | 10/2007 | Ignatius et al. | |
| 7,370,348 B1 | 5/2008 | Patel | |
| 7,382,787 B1 | 6/2008 | Barnes et al. | |
| 7,421,576 B1 | 9/2008 | Kent | |
| 7,496,764 B2 | 2/2009 | Robert | |
| 7,594,262 B2 | 9/2009 | Hanzlik et al. | |
| 7,607,167 B1 | 10/2009 | Johnson et al. | |
| 7,639,696 B2 | 12/2009 | Wu | |
| 7,644,268 B2 | 1/2010 | Filipi-Martin et al. | |
| 7,716,467 B1 | 5/2010 | Deffet et al. | |
| 7,734,844 B2 | 6/2010 | Pedersen et al. | |
| 7,773,754 B2 | 8/2010 | Buer et al. | |
| 7,804,504 B1 | 9/2010 | Agarwal | |
| 7,814,316 B1 | 10/2010 | Hughes et al. | |
| 7,836,490 B2 | 11/2010 | Smith | |
| RE42,212 E | 3/2011 | Hoffman | |
| 7,921,284 B1 | 4/2011 | Kinghorn et al. | |
| 7,921,288 B1 | 4/2011 | Hildebrand | |
| 7,930,540 B2 | 4/2011 | Ahuja et al. | |
| 7,930,756 B1 | 4/2011 | Crocker et al. | |
| 7,958,351 B2 | 6/2011 | Luthl | |
| 7,996,670 B1 | 8/2011 | Krishna et al. | |
| 8,065,713 B1 | 11/2011 | Vainstein et al. | |
| 8,073,949 B2 | 12/2011 | Cunchon et al. | |
| 8,166,289 B2 | 4/2012 | Owens et al. | |
| 8,219,799 B1 | 7/2012 | Lucchesi | |
| 8,229,116 B2 | 7/2012 | Ogata | |
| 8,230,207 B2 | 7/2012 | Iyer et al. | |
| 8,234,686 B2 | 7/2012 | Alvermann et al. | |
| 8,266,433 B1 | 9/2012 | Przykucki et al. | |
| 8,266,670 B1 | 9/2012 | Merkow et al. | |
| 8,275,984 B2 | 9/2012 | Loveless | |
| 8,289,975 B2 | 10/2012 | Suganthi et al. | |
| 8,307,206 B2 | 11/2012 | Ahuja et al. | |
| 8,356,177 B2 | 1/2013 | McGrew et al. | |
| 8,386,768 B2 | 2/2013 | Nair et al. | |
| 8,407,194 B1 | 3/2013 | Chaput et al. | |
| 8,416,954 B1 | 4/2013 | Raizen et al. | |
| 8,418,252 B2 | 4/2013 | Akyol et al. | |
| 8,433,783 B2 | 4/2013 | Jackowski et al. | |
| 8,433,929 B2 | 4/2013 | Yamashita | |
| 8,438,626 B2 | 5/2013 | Anderson et al. | |
| 8,443,069 B2 | 5/2013 | Bagepalli et al. | |
| 8,452,956 B1 | 5/2013 | Kersey | |
| 8,479,304 B1 | 7/2013 | Clifford | |
| 8,536,957 B1 | 9/2013 | Nakamura et al. | |
| 8,539,571 B2 | 9/2013 | Smith | |
| 8,561,127 B1 | 10/2013 | Agrawal et al. | |
| 8,595,814 B2 | 11/2013 | Le et al. | |
| 8,631,460 B2 | 1/2014 | Shea et al. | |
| 8,751,826 B2 | 6/2014 | O'Connor et al. | |
| 8,813,247 B1 | 8/2014 | Alten | |
| 8,909,942 B1 | 12/2014 | Obukhov et al. | |
| 8,935,523 B1 | 1/2015 | Osburn, III | |
| 8,966,249 B2 | 2/2015 | Lindteigen | |
| 8,966,288 B2 | 2/2015 | Ignatius et al. | |
| 8,988,713 B2 | 3/2015 | Gutnik et al. | |
| 9,088,538 B2 | 7/2015 | Lindteigen et al. | |
| 9,100,361 B1 | 8/2015 | Lucchesi et al. | |
| 9,191,200 B1 | 11/2015 | Adams et al. | |
| 9,227,139 B2 | 1/2016 | Mamtani et al. | |
| 9,245,148 B2 | 1/2016 | Runkis et al. | |
| 9,306,917 B2 | 4/2016 | Brugger et al. | |
| 9,317,705 B2 | 4/2016 | O'Hare et al. | |
| 9,317,718 B1 | 4/2016 | Takahashi | |
| 9,355,279 B1 | 5/2016 | Takahashi | |
| 9,374,344 B1 | 6/2016 | Takahashi | |
| 9,374,345 B2 | 6/2016 | Brugger et al. | |
| 9,378,359 B2 | 6/2016 | Qureshi et al. | |
| 9,380,048 B2 | 6/2016 | Lindteigen et al. | |
| 9,524,399 B1 | 12/2016 | Takahashi | |
| 9,536,103 B2 | 1/2017 | Redberg | |
| 9,560,019 B2 | 1/2017 | Barney | |
| 9,660,964 B2 | 5/2017 | Asiedu | |
| 9,680,801 B1 | 6/2017 | Martini | |
| 9,690,598 B2 | 6/2017 | Lindteigen | |
| 9,692,605 B2 | 6/2017 | Lindteigen et al. | |
| 9,705,854 B2 | 7/2017 | Khazan | |
| 9,794,064 B2 | 10/2017 | Takahashi | |
| 9,794,270 B2 | 10/2017 | Lindteigen | |
| 9,798,899 B1 | 10/2017 | Takahashi | |
| 9,858,442 B1 | 1/2018 | Takahashi | |
| 9,871,662 B2 | 1/2018 | Glisson | |
| 9,916,456 B2 | 3/2018 | O'Hare et al. | |
| 10,013,580 B2 | 7/2018 | Takahashi | |
| 10,114,766 B2 | 10/2018 | Takahashi | |
| 10,708,236 B2 | 7/2020 | Takahashi | |
| 10,902,155 B2 | 1/2021 | Takahashi | |
| 11,063,914 B1 | 7/2021 | Takahashi | |
| 2002/0027906 A1 | 3/2002 | Athreya | |
| 2002/0029280 A1 | 3/2002 | Holden | |
| 2002/0083317 A1 | 6/2002 | Ohta | |
| 2002/0091975 A1 | 7/2002 | Redlich et al. | |
| 2002/0099959 A1 | 7/2002 | Redlich et al. | |
| 2002/0162024 A1 | 10/2002 | Cunchon | |
| 2002/0165961 A1 | 11/2002 | Everdell et al. | |
| 2003/0012373 A1 | 1/2003 | Ogura et al. | |
| 2003/0014627 A1* | 1/2003 | Krishna | G06F 21/72 713/153 |
| 2003/0023846 A1 | 1/2003 | Krishna | |
| 2003/0051054 A1 | 3/2003 | Redlich et al. | |
| 2003/0070077 A1 | 4/2003 | Redlich et al. | |
| 2003/0074552 A1 | 4/2003 | Olkin et al. | |
| 2003/0119484 A1 | 6/2003 | Adachi et al. | |
| 2003/0120949 A1 | 6/2003 | Redlich et al. | |
| 2003/0172279 A1 | 9/2003 | Yudasaka | |
| 2003/0182435 A1 | 9/2003 | Redlich et al. | |
| 2003/0196108 A1 | 10/2003 | Kung | |
| 2003/0210702 A1 | 11/2003 | Kendall | |

(56) References Cited

U.S. PATENT DOCUMENTS

| | | |
|---|---|---|
| 2004/0054914 A1 | 3/2004 | Sullivan |
| 2004/0083286 A1 | 4/2004 | Holden |
| 2004/0123096 A1 | 6/2004 | Buer |
| 2004/0123119 A1 | 6/2004 | Buer |
| 2004/0123120 A1 | 6/2004 | Buer |
| 2004/0123121 A1 | 6/2004 | Paaske |
| 2004/0123123 A1 | 6/2004 | Buer |
| 2004/0148500 A1 | 7/2004 | Olkin et al. |
| 2004/0151323 A1 | 8/2004 | Olkin et al. |
| 2005/0010690 A1 | 1/2005 | Marshall et al. |
| 2005/0097357 A1 | 5/2005 | Smith |
| 2005/0132070 A1 | 6/2005 | Redlich et al. |
| 2005/0138109 A1 | 6/2005 | Redlich et al. |
| 2005/0138110 A1 | 6/2005 | Redlich et al. |
| 2005/0166066 A1 | 7/2005 | Ahuja et al. |
| 2005/0190758 A1 | 9/2005 | Gai et al. |
| 2005/0198412 A1* | 9/2005 | Pedersen ............... H04L 9/0894 710/30 |
| 2005/0198498 A1 | 9/2005 | Gaur |
| 2005/0198500 A1 | 9/2005 | Gaur |
| 2005/0257062 A1 | 11/2005 | Ignatius et al. |
| 2006/0015748 A1 | 1/2006 | Goto |
| 2006/0059537 A1 | 3/2006 | Alvermann et al. |
| 2006/0059553 A1 | 3/2006 | Morais |
| 2006/0117126 A1 | 6/2006 | Leung et al. |
| 2006/0129810 A1 | 6/2006 | Jeong |
| 2006/0133604 A1 | 6/2006 | Buer et al. |
| 2006/0149965 A1 | 7/2006 | Sharma |
| 2006/0174102 A1 | 8/2006 | Smith et al. |
| 2006/0174112 A1 | 8/2006 | Wray |
| 2007/0067630 A1 | 3/2007 | Lenkov et al. |
| 2007/0067634 A1 | 3/2007 | Siegler |
| 2007/0074020 A1 | 3/2007 | Nishimura |
| 2007/0115812 A1 | 5/2007 | Hughes |
| 2007/0136801 A1 | 6/2007 | Le et al. |
| 2007/0160198 A1 | 7/2007 | Orsini et al. |
| 2007/0192596 A1 | 8/2007 | Otsuka |
| 2007/0195951 A1 | 8/2007 | Leung, Jr. |
| 2007/0195960 A1 | 8/2007 | Goldman |
| 2007/0204159 A1 | 8/2007 | Hara |
| 2007/0237327 A1 | 10/2007 | Taylor |
| 2007/0245413 A1 | 10/2007 | Andolina |
| 2007/0250921 A1 | 10/2007 | LiVecchi |
| 2007/0258586 A1 | 11/2007 | Huang et al. |
| 2008/0005569 A1 | 1/2008 | Watson et al. |
| 2008/0010233 A1 | 1/2008 | Sack |
| 2008/0022136 A1 | 1/2008 | Mattson |
| 2008/0037777 A1 | 2/2008 | Ignatius et al. |
| 2008/0052533 A1 | 2/2008 | Iida et al. |
| 2008/0052765 A1 | 2/2008 | Shinomiya et al. |
| 2008/0062803 A1* | 3/2008 | Fronte ............... G06F 21/72 365/230.03 |
| 2008/0091945 A1 | 4/2008 | Princen et al. |
| 2008/0098226 A1 | 4/2008 | Zokumasui |
| 2008/0130889 A1 | 6/2008 | Qi |
| 2008/0130894 A1 | 6/2008 | Qi |
| 2008/0141023 A1 | 6/2008 | Qi |
| 2008/0151893 A1 | 6/2008 | Nordmark et al. |
| 2008/0168135 A1 | 7/2008 | Redlich et al. |
| 2008/0181406 A1* | 7/2008 | Iyer .................. G06F 21/85 380/277 |
| 2008/0183992 A1 | 7/2008 | Martin et al. |
| 2008/0288782 A1 | 11/2008 | Iyer |
| 2009/0019527 A1 | 1/2009 | Winslow |
| 2009/0034734 A1 | 2/2009 | Owens et al. |
| 2009/0043901 A1 | 2/2009 | Mizikovsky et al. |
| 2009/0046858 A1 | 2/2009 | Iyer et al. |
| 2009/0097661 A1 | 4/2009 | Orsini et al. |
| 2009/0129388 A1* | 5/2009 | Akhtar ............... H03M 7/30 370/392 |
| 2009/0177894 A1 | 7/2009 | Orsini et al. |
| 2009/0178144 A1 | 7/2009 | Redlich et al. |
| 2009/0198997 A1 | 8/2009 | Yeap et al. |
| 2009/0228708 A1 | 9/2009 | Trostle |
| 2009/0254572 A1 | 10/2009 | Redlich et al. |
| 2009/0254750 A1 | 10/2009 | Bono et al. |
| 2009/0327617 A1* | 12/2009 | Furuichi ............ G06F 21/6218 711/147 |
| 2010/0010968 A1 | 1/2010 | Redlich et al. |
| 2010/0115260 A1 | 5/2010 | Venkatesan et al. |
| 2010/0153702 A1 | 6/2010 | Loveless |
| 2010/0153704 A1 | 6/2010 | Winslow |
| 2010/0161981 A1 | 6/2010 | Dodgson et al. |
| 2010/0169645 A1 | 7/2010 | McGrew et al. |
| 2010/0198730 A1 | 8/2010 | Ahmed et al. |
| 2010/0250497 A1 | 9/2010 | Redlich et al. |
| 2010/0254537 A1 | 10/2010 | Buer et al. |
| 2010/0274861 A1 | 10/2010 | Asiedu |
| 2010/0278338 A1 | 11/2010 | Chang et al. |
| 2010/0299313 A1 | 11/2010 | Orsini et al. |
| 2011/0087889 A1 | 4/2011 | Iyer et al. |
| 2011/0131138 A1 | 6/2011 | Tsuchiya |
| 2011/0153969 A1 | 6/2011 | Petrick |
| 2011/0154019 A1 | 6/2011 | Wang |
| 2011/0154031 A1 | 6/2011 | Banerjee et al. |
| 2011/0167265 A1 | 7/2011 | Ahuja et al. |
| 2011/0202755 A1 | 8/2011 | Orsini et al. |
| 2011/0246766 A1 | 10/2011 | Orsini et al. |
| 2011/0246785 A1 | 10/2011 | Linsley et al. |
| 2011/0252480 A1 | 10/2011 | Patawaran et al. |
| 2011/0264905 A1 | 10/2011 | Ovsiannikov |
| 2011/0283339 A1* | 11/2011 | Smith .................. H04L 63/083 726/4 |
| 2011/0296440 A1 | 12/2011 | Laurich et al. |
| 2012/0011351 A1 | 1/2012 | Mundra et al. |
| 2012/0066509 A1 | 3/2012 | Lapp et al. |
| 2012/0072723 A1 | 3/2012 | Orsini et al. |
| 2012/0110316 A1* | 5/2012 | Chamberlain ........ G06F 9/4881 713/100 |
| 2012/0159183 A1 | 6/2012 | Adams et al. |
| 2012/0166576 A1 | 6/2012 | Orsini et al. |
| 2012/0166818 A1 | 6/2012 | Orsini et al. |
| 2012/0179916 A1 | 7/2012 | Staker et al. |
| 2012/0198241 A1 | 8/2012 | O'Hare et al. |
| 2012/0204032 A1 | 8/2012 | Wilkins et al. |
| 2012/0210119 A1 | 8/2012 | Baxter et al. |
| 2012/0213360 A1 | 8/2012 | Le Quere |
| 2012/0233472 A1 | 9/2012 | Faraboschi |
| 2012/0246489 A1 | 9/2012 | Brelot |
| 2012/0257506 A1* | 10/2012 | Bazlamacci ............ H04L 12/66 709/212 |
| 2012/0278529 A1 | 11/2012 | Hars |
| 2012/0303826 A1 | 11/2012 | Nelson |
| 2012/0324222 A1 | 12/2012 | Massey et al. |
| 2012/0331088 A1 | 12/2012 | O'Hare et al. |
| 2013/0013931 A1 | 1/2013 | O'Hare et al. |
| 2013/0034229 A1 | 2/2013 | Sauerwald |
| 2013/0077788 A1 | 3/2013 | Blanchard et al. |
| 2013/0124852 A1 | 5/2013 | Haeger |
| 2013/0254542 A1 | 9/2013 | Buer et al. |
| 2013/0268931 A1 | 10/2013 | O'Hare et al. |
| 2013/0305039 A1 | 11/2013 | Gauda |
| 2013/0311780 A1 | 11/2013 | Besehanic |
| 2014/0013123 A1 | 1/2014 | Khazan et al. |
| 2014/0013452 A1 | 1/2014 | Aissi et al. |
| 2014/0108782 A1 | 4/2014 | Salinger et al. |
| 2014/0108785 A1 | 4/2014 | Lindteigen et al. |
| 2014/0122866 A1 | 5/2014 | Haeger |
| 2014/0143533 A1 | 5/2014 | Ganong, III et al. |
| 2014/0143538 A1 | 5/2014 | Lindteigen |
| 2014/0195793 A1 | 7/2014 | Lindteigen |
| 2014/0195798 A1 | 7/2014 | Brugger et al. |
| 2014/0229731 A1 | 8/2014 | O'Hare et al. |
| 2014/0245007 A1 | 8/2014 | Buer et al. |
| 2014/0250300 A1 | 9/2014 | Runkis et al. |
| 2014/0281526 A1 | 9/2014 | Lindteigen |
| 2014/0324698 A1 | 10/2014 | Dolcino et al. |
| 2015/0074409 A1 | 3/2015 | Reid et al. |
| 2015/0095645 A1 | 4/2015 | Eldar |
| 2015/0154418 A1 | 6/2015 | Redberg |
| 2015/0163229 A1 | 6/2015 | Lindteigen |
| 2015/0188893 A1 | 7/2015 | Sood |
| 2015/0222604 A1 | 8/2015 | Ylonen |
| 2015/0256518 A1 | 9/2015 | Buer et al. |

(56) References Cited

U.S. PATENT DOCUMENTS

| | | |
|---|---|---|
| 2015/0271151 A1 | 9/2015 | Brugger et al. |
| 2015/0363608 A1 | 12/2015 | Redberg |
| 2015/0363611 A1 | 12/2015 | Redberg |
| 2015/0381710 A1 | 12/2015 | Kish |
| 2016/0056956 A1 | 2/2016 | O'Hare |
| 2016/0219024 A1 | 7/2016 | Verzun et al. |
| 2016/0308680 A1 | 10/2016 | Lindteigen |
| 2017/0019377 A1 | 1/2017 | Lindteigen |
| 2017/0061141 A1 | 3/2017 | Redberg |
| 2017/0075821 A1 | 3/2017 | Takahashi |
| 2017/0083725 A1 | 3/2017 | Takahashi |
| 2017/0085372 A1 | 3/2017 | Anderson et al. |
| 2017/0093587 A1 | 3/2017 | Glisson |
| 2017/0098096 A1 | 4/2017 | Redberg |
| 2017/0118180 A1 | 4/2017 | Takahashi |
| 2017/0118214 A1 | 4/2017 | Vainstein |
| 2017/0126623 A1 | 5/2017 | Lindteigen |
| 2017/0149748 A1 | 5/2017 | Lindteigen |
| 2017/0201382 A1 | 7/2017 | Lindteigen |
| 2017/0286669 A1 | 10/2017 | O'Hare et al. |
| 2018/0041485 A1 | 2/2018 | O'Hare et al. |
| 2018/0068125 A1 | 3/2018 | Redberg |
| 2018/0082084 A1 | 3/2018 | Takahashi et al. |
| 2018/0139061 A1 | 5/2018 | Glisson |
| 2018/0176194 A1 | 6/2018 | Xiong |
| 2018/0268173 A1 | 9/2018 | Takahashi et al. |
| 2019/0050348 A1 | 2/2019 | Takahashi et al. |

FOREIGN PATENT DOCUMENTS

| | | |
|---|---|---|
| WO | 2017/048896 | 3/2017 |
| WO | 2017/074887 | 5/2017 |
| WO | 2018/231519 | 12/2018 |

OTHER PUBLICATIONS

European Patent Office; Communication Pursuant to Article 94(3) EPC, issued in connection to application No. EP16847265.2; dated Oct. 12, 2020; 6 pages; Europe.
Menezes, A. et al.; Chapter 7: Block Ciphers ED; Handbook of Applied Cryptography; Oct. 1, 1996; 223-282 pages; CRC Press Series on Discrete Mathematics and its Applications; CRC Press.
Blum, Thomas et al. Worcester Polytechnic Institute ECE Department. "Montgomery Modular Exponentiation on Reconfigurable Hardware" Apr. 1999. pp. 1-8, 8 pages.
Carbonite White Paper—"The Better Backup Plan, Making Sense of the Cloud"; 5 pages.
Carbonite White Paper—"The Better Backup Plan, Trouble Free Backup Solutions"; 3 pages.
Korean Intellectual Property Office; International Patent Application No. PCT/US2016/058568, International Search Report and Written Opinion, dated Jan. 20, 2017; 9 pages; Korea.
Korean Intellectual Property Office; International Patent Application No. PCT/US2016/051834, International Search Report and Written Opinion, dated Dec. 21, 2016; 11 pages; Korea.
McIvor et al. The Institute of Electronics, Communications and Information Technology (ECIT) "High-Radix Systolic Modular Multiplication on Reconfigurable Hardware." 2005. pp. 13-18, 6 pages.
Nedjah, Nadia et al. State University of Rio de Janeiro, Department de Systems of Engineering and Computation. "Systolic Hardware Implementation for the Montgomery Modular Multiplication." 6 pages.
Wikipedia; Hardware Security Module; 6 pages.
The International Bureau of WIPO; PCT International Preliminary Report on Patentability, Issued for PCT/US2016/058568; dated May 11, 2018; 5 pages; Europe.
The International Bureau of WIPO; PCT International Preliminary Report on Patentability, Issued for PCT/US2016/051834; dated Mar. 20, 2018; 9 pages; Europe.
Korean Intellectual Property Office; International Patent Application No. PCT/US2018/035052, International Search Report and Written Opinion, dated Sep. 11, 2018; 11 pages; Korea.
European Patent Office; Extended European Search Report, issued in connection to EP16847265.2; dated Feb. 11, 2019; 11 pages; Europe.
Israeli Patent Office; Office Action issued in connection to application No. 258095; dated Dec. 17, 2019; 5 pages; Israel.
The International Bureau of WIPO; PCT International Preliminary Report on Patentability, issued in connection to PCT/US2018/035052; dated Dec. 17, 2019; 9 pages; Switzerland.
Australian Government, IP Australia; Examination Report No. 1 for Standard Patent Application, issued in connection to application No. 2016323147; dated Mar. 25, 2020; 5 pages; Australia.
European Patent Office; Extended European Search Report, issued in connection to EP18816604.5; dated Mar. 18, 2020; 8 pages; Europe.
Japanese Patent Office; Office Action Summary, issued in connection to application No. 2018-534774; dated Oct. 6, 2020; 4 pages; Japan.
Jang-Jaccard et al.; Portable Key Management Service for Cloud Storage; Oct. 2012; IEEE; pp. 147-156.

\* cited by examiner

Figure 15: Physically isolated classified domains

Figure 16: A Notional Mobile MILS Solution

Figure 17: MILS Block diagram

Figure 18: MILS concept securely sending data over the cloud

MULTI-INDEPENDENT LEVEL SECURE (MILS) STORAGE ENCRYPTION

RELATED APPLICATIONS

This is a continuation application of U.S. Non-Provisional application Ser. No. 15/332,059, filed Oct. 24, 2016, entitled "MULTI-INDEPENDENT LEVEL SECURE (MILS) STORAGE ENCRYPTION," by Richard J. Takahashi, which itself claims priority to U.S. Provisional Application Ser. No. 62/246,299, filed Oct. 26, 2015, entitled "MULTI-INDEPENDENT LEVEL SECURE (MILS) STORAGE ENCRYPTION," by Richard J. Takahashi, the entire contents of which applications are incorporated by reference as if fully set forth herein.

This application is related to U.S. Non-Provisional application Ser. No. 14/208,337, filed Mar. 13, 2014, entitled "MULTI-TENANCY ARCHITECTURE," by Richard J. Takahashi, the entire contents of which application is incorporated by reference as if fully set forth herein.

This application is related to U.S. Non-Provisional application Ser. No. 14/198,097, filed Mar. 5, 2014, entitled "MULTI-LEVEL INDEPENDENT SECURITY ARCHITECTURE," by Richard J. Takahashi, the entire contents of which application is incorporated by reference as if fully set forth herein.

This application is related to U.S. Non-Provisional application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, the entire contents of which application is incorporated by reference as if fully set forth herein.

FIELD OF THE TECHNOLOGY

At least some embodiments disclosed herein relate to security processing and data storage in general, and more particularly, but not limited to, security processing (e.g., in a multi-tenancy or other architecture).

BACKGROUND

In existing solutions to multi-tenancy, each customer is physically separated with its own network and network equipment with required protection. As the data center customer base expands, this expansion requires additional floor space. This additional floor space requires costly new buildings, and all of its related infrastructure in order to meet the new customer demands.

Multi-tenancy is a business model in which many companies, governments, and other entities store their data in a commonly-shared data center or storage array. There are data centers to conserve floor space that will store multiple customers' data in a common storage area. One problem with such storage is that a given customer's data is stored/mixed with the data for many of the other customers. Thus, an operator or equipment error may lead to the given customer's data accidently or inadvertently being read or accessed by one or more of the other customers.

SUMMARY OF THE DESCRIPTION

Systems and methods to provide security processing and/or storage for incoming data (e.g., data packets) in a multi-tenancy or other architecture (e.g., using one or more security devices) is described herein. Some embodiments are summarized in this section.

In one embodiment, a multi-independent level secure (MILS) storage encryption system encrypts and stores different data to an encrypted data storage. In one embodiment, the system comprises isolated input/outputs using independent encryption engines with a single encrypted data output to, for example, a "flat" data storage array.

In one embodiment, a method includes: receiving, by a first computing device on a first port of a plurality of ports, a data packet, wherein each of the ports corresponds to one of a plurality of security classes, and the first computing device comprises a plurality of cryptographic modules, each module configured to encrypt data for a respective one of the security classes; tagging the data packet, wherein tagging data identifies one of the security classes and the first port; routing, based on at least one header, the data packet to a first cryptographic module of the plurality of cryptographic modules; encrypting the data packet using the first cryptographic module; and storing the encrypted data packet in a first data storage device.

In one embodiment, a system includes a security device, configured for cryptographic processing, coupled to receive incoming data from a plurality of data sources (e.g., data from different companies, or other different customers or users), wherein the incoming data includes first data from a first data source; a controller (e.g., a key manager) configured to select a first set of keys from a plurality of key sets, each of the key sets corresponding to one of the plurality of data sources, wherein the first set of keys is used by the security device to encrypt the first data; and a common encrypted data storage, coupled to receive the encrypted first data from the security device.

In one embodiment, a system includes a plurality of security devices, each configured for cryptographic processing, coupled to receive incoming data from at least one data source; and a plurality of key managers, each key manager associated with a user, each key manager coupled to a respective one of the security devices, and each key manager configured to provide a set of keys to the security device for encryption of incoming data associated with the respective user, wherein the incoming data is to be stored in a common encrypted data storage after the encryption.

In one embodiment, a security device includes a plurality of cryptographic cores (e.g., a core configured using a systolic array) including an input core configured to perform encryption for a first data packet; at least one key cache storing a plurality of key sets, wherein a first set of keys is selected from the plurality of key sets to encrypt the first data packet by the input core; and a packet input engine configured to detect a header of the first data packet and to address the first set of keys. In one embodiment, the keys are initially provided to the security device by an external key manager through an application programming interface.

The disclosure includes methods and apparatuses which perform the above. Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
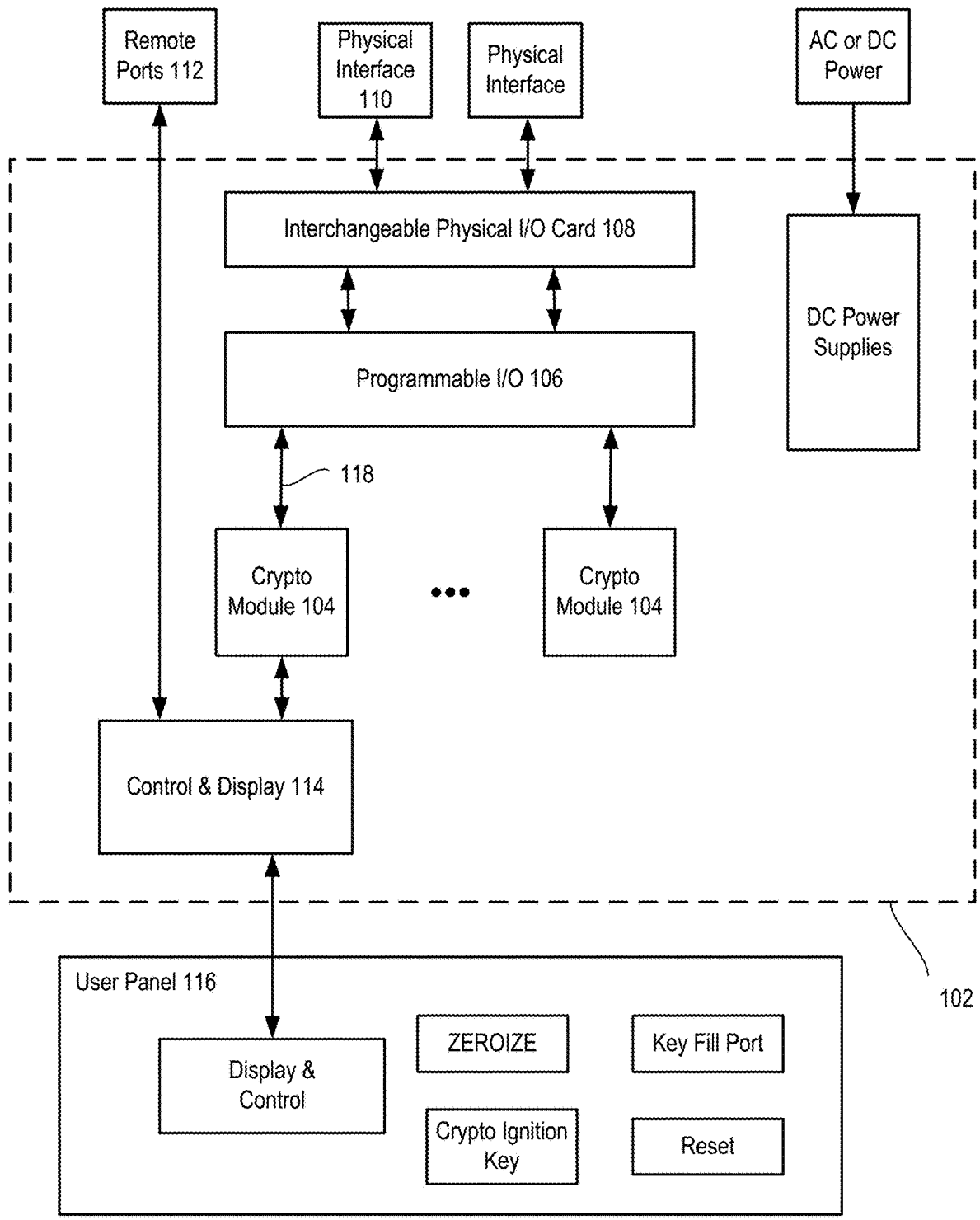
FIG. 1 shows a security processing system including a security device with a plurality of programmable cryptographic modules and a programmable input/output interface, according to one embodiment.

FIG. 1 shows a security processing system including a security device 102 with a plurality of programmable cryptographic modules 104 and a programmable input/output interface 106, according to one embodiment. An interchangeable physical interface 108 is configured to receive a plurality of incoming packets from a data source (e.g., through physical interface 110). In one embodiment, the plurality of cryptographic modules is configured using at least two systolic layers for processing of packets, control data, and keys as discussed further below.

Programmable input/output interface 106 is coupled to the interchangeable physical interface and is configured to route each of the plurality of incoming packets to one of the cryptographic modules 104 for encryption to provide a plurality of encrypted packets. The programmable input/output interface 106 is configured to route the encrypted packets to a common internal or external data storage.

For outgoing packets, programmable input/output interface 106 routes encrypted packets to one of the cryptographic modules 104 for decryption. The decrypted packets are then routed by programmable input/output interface 106 to the data source.

In one embodiment, programmable input/output interface 106 is programmable to support different interface protocols, and each of the plurality of cryptographic modules 104 is programmable to support different encryption protocols (e.g., each module 104 may be programmed to support a different protocol). Programmable input/output interface 106 may include one or more field-programmable gate arrays that are programmable to support the different interface protocols. In one embodiment, programmable input/output interface 106 may be coupled to the cryptographic modules 104 by a high-speed bus such as, for example, a PCI-e bus.

In one embodiment, the interchangeable physical interface 108 is configurable to support two different physical interfaces. In one example, the interchangeable physical interface 108 comprises a replaceable physical input/output panel (or card) that can be replaced independently of the programmable input/output interface 106 and the plurality of cryptographic modules 104.

FIG. 1 also illustrates a control and display unit 114 coupled to control operation of cryptographic modules 104, and also to send or receive data over remote ports 112. Remote ports 112 may be, for example, RS-232, USB, or GigEthernet ports. Remote ports 112 may implement communications using, for example, an SNMP protocol.

Control and display unit 114 provides drivers to a display and status control screen on the user panel 116. User panel 116 also provides soft or hard buttons for user control and data input during the operation of security device 102. Various functions controllable on user panel 116 include a zeroize control (to zeroize the keys), a crypto ignition key (to start the encryption process), a key fill port (to load the keys), and a system reset.

In one embodiment, security device 102 (which may be, e.g., implemented as a security appliance) is used to prevent data breaches by a hacker trying to gain access to encrypted data. In this embodiment, security device 102 provides security, encryption, high-assurance, high-availability sustained bandwidths up to 400 Gbs (full duplex), programmability for data-at-rest and in-network applications. The security device 102 has an interchangeable I/O flexible module as described above to support different physical (PHY) interface connectors and electronics.

In one embodiment, use of the interchangeable I/O interface 108 and programmable I/O interface 106 (implemented using an FPGA I/O systolic array) provides the following advantages:

1) The FPGA I/O systolic array can be programmed for different interfaces and the interchangeable I/O is designed with the selected interface's physical electronics and connectors. This permits the main physical chassis of security device 102 to remain unchanged and to readily use different interface options that can be changed by a user.
2) The security device architecture in conjunction with the interchangeable I/O provides a high-density connectors capability. These flexible I/O design features can be programmed for many different types of interfaces to maximize interfacing flexibility to an end network application.
3) Scalable performance in programmable specified data rate increments for each cryptographic module up to, e.g., six modules which will have up to six times the programmed full duplex data rates. Other lesser or greater numbers of cryptographic modules may be used in other designs.

In one embodiment, flexible I/Os and flexible cryptographic (sometimes simply referred to as "crypto" herein) modules are accomplished by using a scalable systolic architecture and crypto-modules and interchangeable input/output (I/O) card, as described herein. The security device 102 has programmable delay latencies for a specified data block size of programmable bytes sizes. The security device architecture has two programmable elements: the programmable crypto-module and the programmable flexible I/O.

In one embodiment, the flexible I/O has two components: The FPGAs can be programmed to support different interface protocols, and an interchangeable physical I/O card is used to support the physical interfaces and connectors. The flexible I/O also has a switching network. The scalable and programmable crypto-module has a programmable full duplex bandwidth consisting of high performance CPUs and FPGAs clocking up to maximum allowable clock rates internal to the FPGA. This CPU and FPGA in systolic-matrix configuration and implementation provides a fully-programmable system to meet many different applications.

In one embodiment, the security device crypto-module design will be using high performance CPU or equivalent processors and FPGAs forming a programmable systolic scalable module. The programmability efficiencies of design are realized by segmenting functional subsystems from packet engines, crypto engines, key handler and overhead-control management engines. The I/O interface incorporates functional blocks (e.g., 100 Gbs Ethernet, PCI-express, Fibre channel, SAS, Infiniband, SCSI, or any other high speed interface protocols) that are incorporated.

In one embodiment, the security device 102 can be both a media-level encryptor and a file system encryptor. All data payload passing thru security device 102 is encrypted except for the file system headers-commands (which remain in the clear). Therefore, the existing file system will be intact with no drivers required for the end system. The only interface required is for the end system remote management and key management products. This makes the security device transparent to a user or network storage system.

Figure 2:
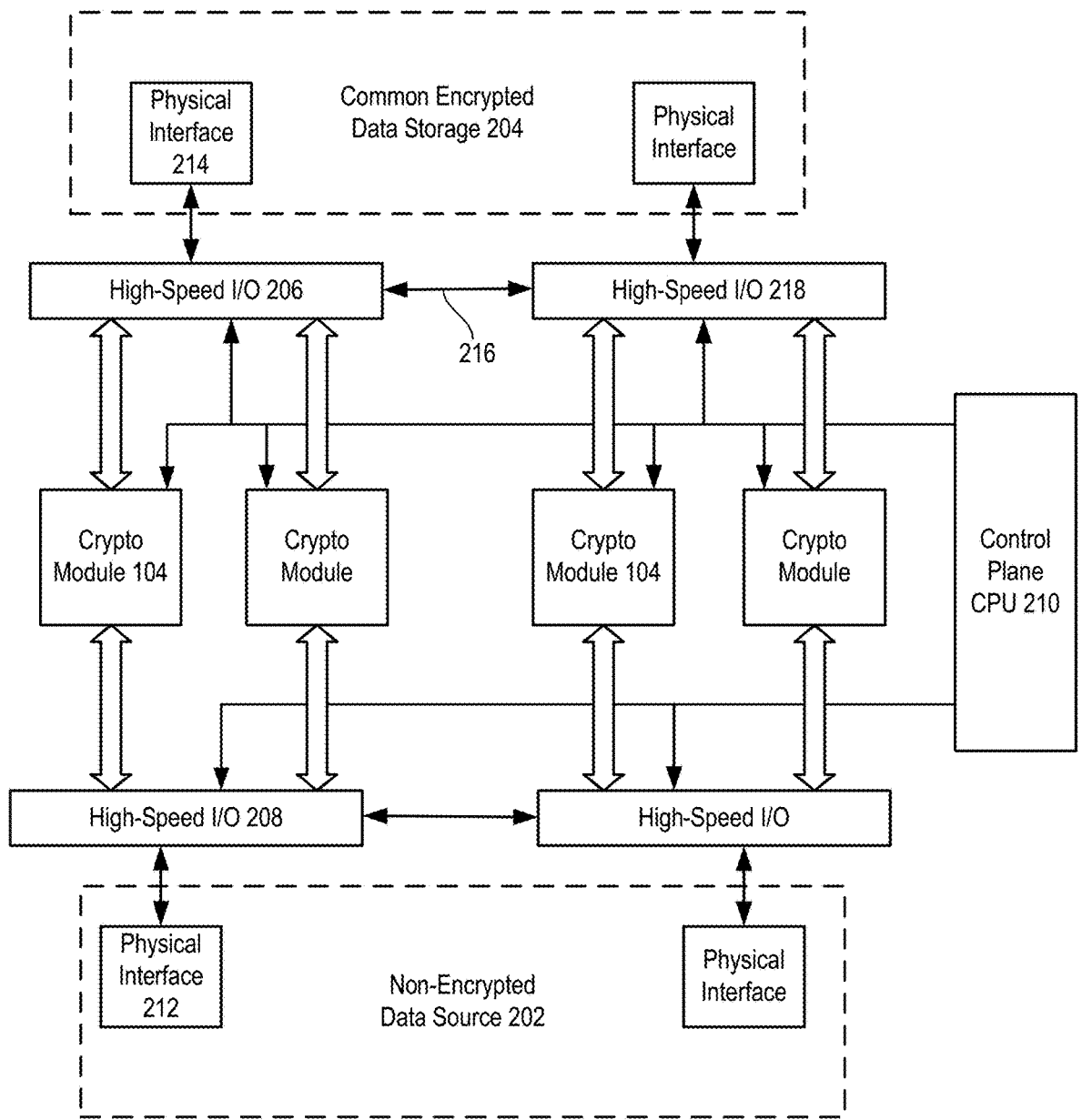
FIG. 2 shows a systolic-matrix security processing system for receiving and encrypting data packets from a non-encrypted data source, and concurrently processing control and data from a control plane for storage in a common encrypted data storage, according to one embodiment.

FIG. 2 shows a security processing system for receiving and encrypting data packets from a non-encrypted data source 202 for storage in a common encrypted data storage 204, according to one embodiment. The system includes cryptographic modules 104. Each cryptographic module is coupled between programmable high-speed input/output (I/O) interfaces 206 and 208, which are each coupled to an interchangeable physical interface (see, e.g., interface 108 in FIG. 1). In one embodiment, interfaces 206 and 218 communicate with each other during security data processing using, for example, a serial bus 216 (e.g., an Interbus serial bus).

Processor 210 handles control plane and data processing for the cryptographic modules 104 and the high-speed input/output interfaces 206, 208, 218. In one embodiment, processor 210 is a control plane processor configured to control systolic data flow for the cryptographic modules 104, and also to control loading of keys from an external key manager to an internal key cache (see, e.g., FIG. 9 below).

Physical interface 212 receives a plurality of incoming packets from data source 202. The first programmable high-speed input/output interface 208 routes each of the plurality of incoming packets to one of the cryptographic modules 104 for encryption processing to provide encrypted packets. The second programmable high-speed programmable input/output interface 206 routes the encrypted packets from the cryptographic module 104 to common encrypted data storage 204 via physical interface 214.

In one embodiment, the routing and switching functions of high-speed interfaces 206 and 208 are provided by programmable input/output interface 106 of FIG. 1. In one embodiment interchangeable physical input/output interface 108 includes physical interface 212 and/or 214.

In one embodiment, each of the encrypted packets has a respective tag to identify an original entry port (e.g., a port of high-speed I/O interface 208), keys or key addresses associated with each of the encrypted packets is decrypted by one of the cryptographic modules to provide corresponding decrypted packets, and the first programmable input/output interface 208 is further configured to use the respective tag to route each decrypted packet back to its original entry port.

In one embodiment, each programmable input/output interface 206, 208, 218 is programmable to support different interface protocols. For example, the first programmable input/output interface 208 may include a plurality of field-programmable gate arrays that are programmable to support the different interface protocols.

In one embodiment, the first programmable input/output interface 208 and the second programmable input/output interface 206 each comprise a switching network and a router (not shown) to route incoming packets (from data source 202 or data storage 204, respectively) to one of the cryptographic modules 104.

In one embodiment, each cryptographic module 104 is designed and programmed, and mathematically optimized for any cryptographic algorithms and network IP protocols. The design can be scaled up to, for example, six or more crypto modules. The security device 102 can be mathematically optimized, for example, for any cryptographic algorithms for full-duplex data rate performance.

In one embodiment, the security device architecture is adaptable to any enterprise class data-at-rest or IP network solution due to the flexible switching I/O architecture. The flexible input and output switching I/O interfaces provide a significant cost advantage and homogeneous data flow and relax the need for data separation. The security device may use FPGAs that bridge to the native I/O interface for the required number of crypto-modules. This allows a single crypto-module to be used with many possible system implementations and configurations based on the end application I/O type and throughput requirements and also be scalable with programmable data rate increments.

In one embodiment, the flexible switch I/O architecture described herein includes programmable I/O modules (using FPGAs) that function as a low latency bridge and switch between the native I/O to the target data-at-rest system and to the internal array of crypto-module processors. A pair of separated, designated programmable FPGA-based I/O interface modules bridges security device 102 to an industry standard network. This scalability and flexibility enables security device 102 to be inserted into existing or new storage network systems supporting scalable data rates.

In one embodiment, the flexible programmable I/O interface is adaptable to any enterprise, or mobile, class data-at-rest interface application. The flexible I/O architecture includes programmable I/O modules (using FPGAs) that function as a low latency bridge between the native I/O of the target data-at-rest system and the internal array of crypto-modules. Flexible I/O programmability is based on FPGA-based modules that can be programmed to any industry standards or a custom interface to the storage system fabric or IP network.

In one embodiment, security device 102 performs at data rates only limited by the technology used. The key-handling agility is matched to the data rates. The internal key management is central to the performance of the cryptographic module in this embodiment.

Figure 3:
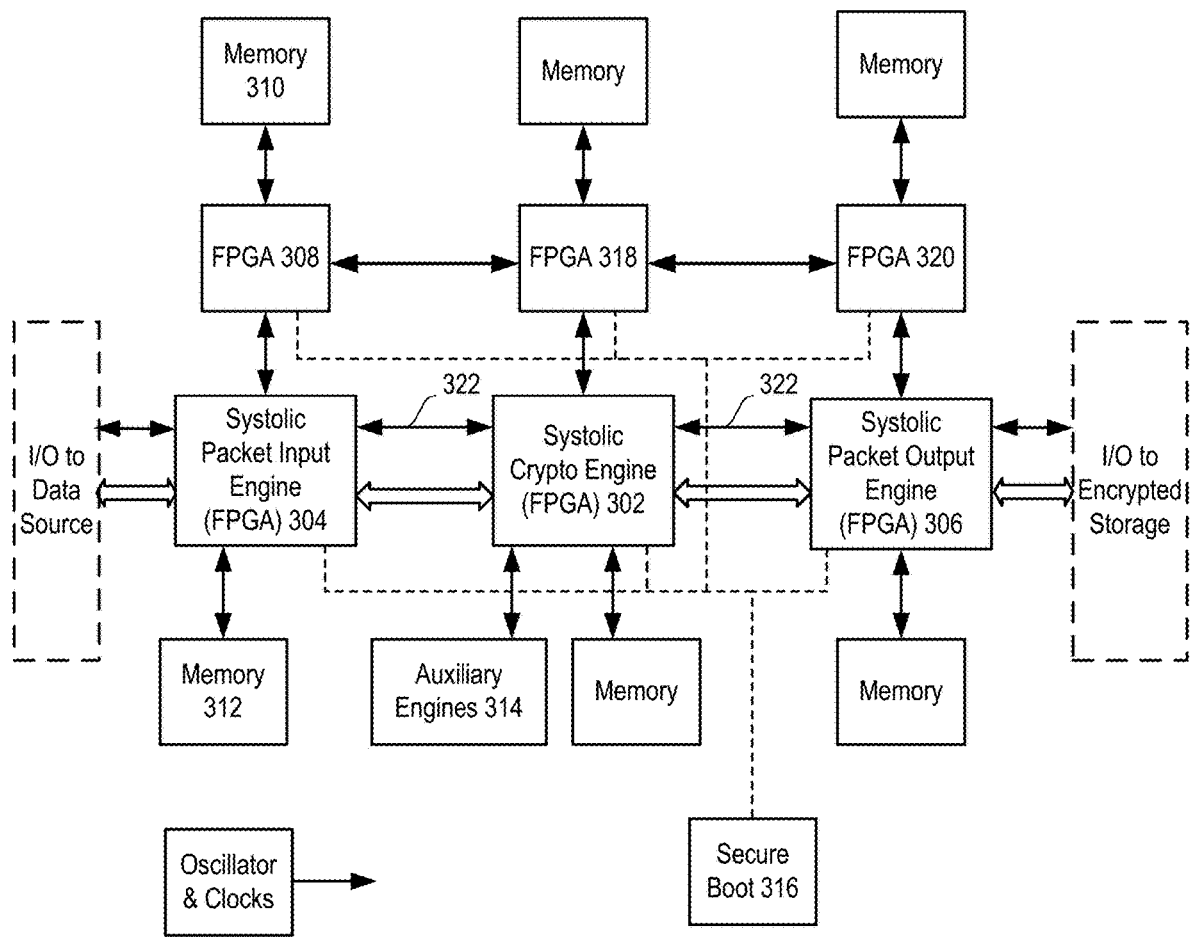
FIG. 3 shows a systolic-matrix cryptographic module including programmable input and output packet engines and a programmable cryptographic processing engine, according to one embodiment.

FIG. 3 shows a cryptographic module 104 including programmable input and output packet engines and a programmable cryptographic processing engine, according to one embodiment. More specifically, cryptographic module 104 comprises a programmable packet input engine 304, a programmable cryptographic engine 302, and a programmable packet output engine 306. In one embodiment, packet engines 304 and 306 are coupled to cryptographic engine 302 using a high-speed serial or parallel bus 322 (e.g., an Interbus bus) for control operations, and using high-speed data busses for data transfer.

In one embodiment, the programmable packet input engine 304, the programmable cryptographic engine 302, and the programmable packet output engine 306 are each configured as a systolic-matrix array and each include one or more field-programmable gate arrays (FPGAs) programmable to support different security protocols. In one example, the programmable packet input engine 304, the programmable cryptographic engine 302, and the programmable packet output engine 306 are each coupled to a respective dedicated program memory for each FPGA (e.g., memory 310 or 312), and to a respective dedicated processor (not shown) to control programming of each FPGA. Each memory 310, 312 may be used, e.g., to provide data, keys buffering and/or storage.

In a method according to one embodiment, the first programmable input/output interface 208 (see FIG. 2) includes a field-programmable gate array (FPGA), and the method includes programming the FPGA to support a different interface protocol than previously used for receiving incoming data packets. In this method, each of the plurality of cryptographic modules 104 includes programmable systolic packet input engine 304, programmable systolic-matrix cryptographic engine 302, and programmable systolic-matrix packet output engine 306. The method further includes programming an FPGA of the packet input engine 304, an FPGA of the cryptographic engine 302, and an FPGA of the packet output engine 306.

In one embodiment, a top systolic layer includes FPGAs 308, 318, and 320, which are coupled to systolic packet engines 304, 306 and cryptographic engine 302, each also including an FPGA, in order to form a two-dimensional systolic-matrix array for data and control processing.

In one embodiment, each crypto module 104 has input and output packet engines and the crypto core. The crypto module has a systolic crypto engine that is tightly coupled to the input and output systolic packet engines. Each element in the crypto module has a dedicated high-performance CPU plus its memory, and dedicated memory to the input-output systolic packet engines and crypto core buffer/storage memory.

In one embodiment, each FPGA(s) array has a dedicated program memory. Also, a compression engine (included, e.g., in auxiliary engines 314) is included for data compression or other data processing required.

In one embodiment, the crypto module of FIG. 3 uses secure boot 316 to verify the FPGA code and that any software (SW) within the crypto module is encrypted-secure and authenticated. During the secure boot process, if any anomalies are detected, the system will not boot and further may provide a user alert that issues have been detected. The secure boot 316 may be designed to work with existing industry key manager systems.

In one embodiment, the crypto module design of FIG. 3 provides features such as hard-wired, one-time programmable options and custom analog/digital circuits for flexible physical partitioning for un-encrypted (plain text) and encrypted (cipher text) separation.

Figure 4:
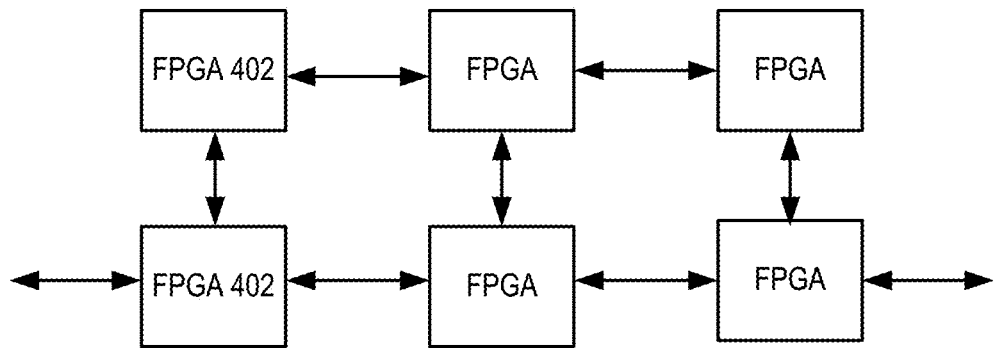
FIGS. 4 and 5 each show an example of a systolic-matrix array with two-dimensional computing paths, according to various embodiments.
Figure 5:
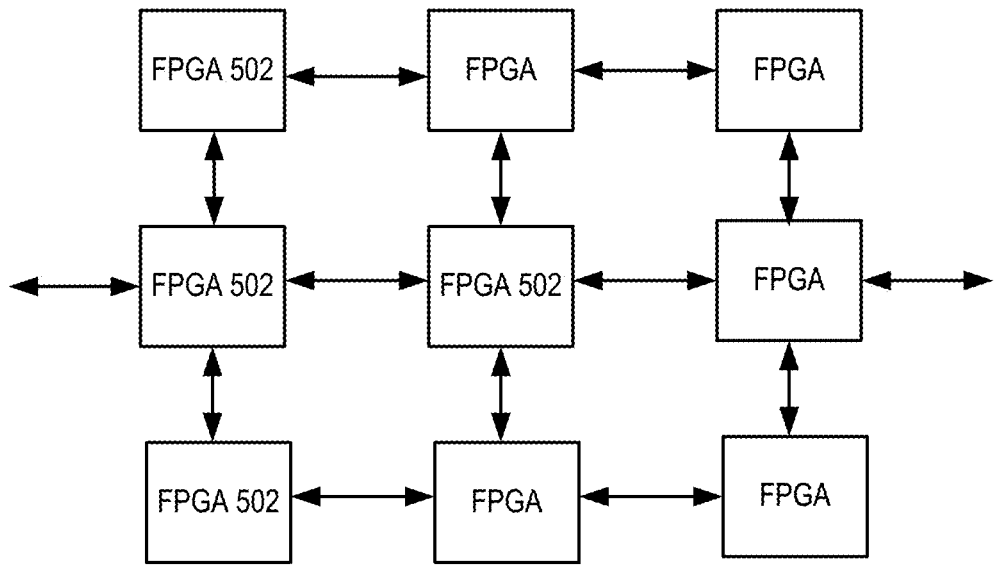

FIGS. 4 and 5 each show an example of a systolic-matrix array with two-dimensional computing paths, according to various embodiments. FIG. 4 shows FPGAs 402 organized in a systolic-matrix array for data, keys and control processing of security packets. Although FPGAs are shown forming the systolic-matrix array in FIG. 4, other forms of programmable devices, or other types of data processing units or processors may be used to form the systolic-matrix array in other embodiments (e.g., ASICs may be used). FIG. 5 shows an alternative configuration for systolic-matrix array comprising FPGAs 502 for data control processing of security packets.

In one embodiment, each cryptographic module 104 is implemented using a systolic-matrix array configuration. For example, cryptographic module 104 as illustrated in FIG. 3 is configured in a systolic-matrix array such as the basic form illustrated in FIG. 4. In addition, in one embodiment, the input and output packet engines 304, 306 and/or the cryptographic processing engine 302 for each cryptographic module 104 are also each themselves designed with an internal systolic-matrix array architecture. For example, the cryptographic processing engine 302 may be configured in a systolic-matrix array configuration such as illustrated in FIG. 5. In another example, each packet engine may itself have the systolic array configuration of FIG. 4 or FIG. 5, or yet other systolic array configurations, as part of its internal sub-block processing architecture.

Thus, as described above, in some embodiments, security device 102 is configured with a two or greater multiple-layer systolic-matrix array architecture. In this architecture, each cryptographic module 104 has a systolic-matrix array configuration (i.e., a top systolic array layer), and each of the packet engines and/or cryptographic processing engine has an internal systolic-matrix array configuration (e.g., in a lower systolic array layer formed of FPGAs that is logically underneath the top systolic-matrix array layer). The multiple-layers above combined with two-dimensional systolic arrays provides a three-dimensional systolic-matrix architecture for security device 102.

Figure 6:
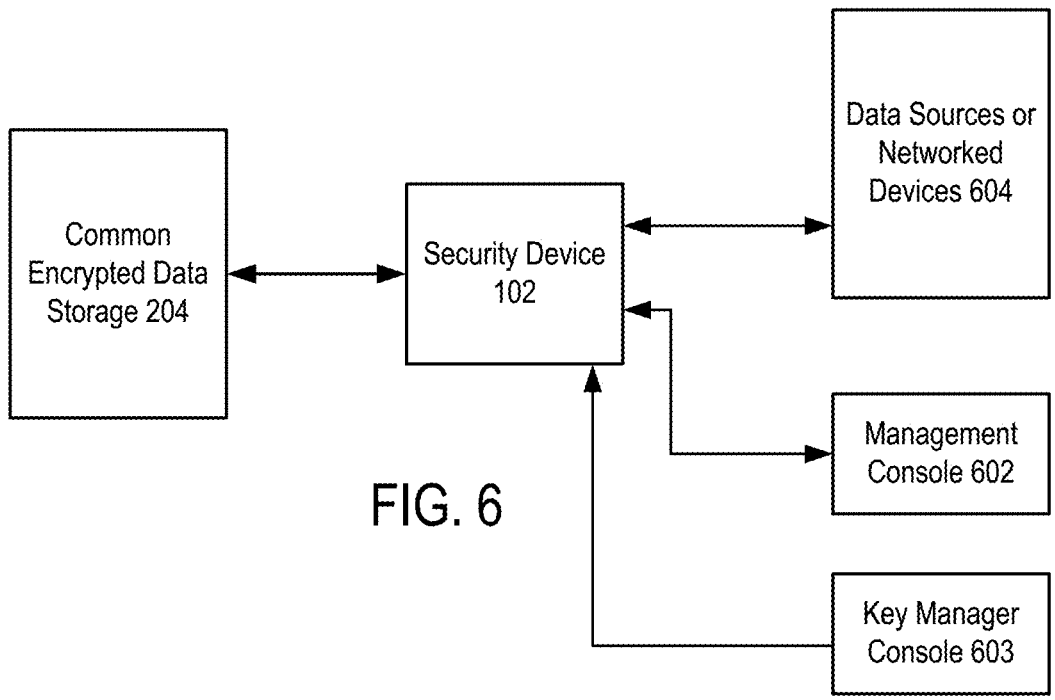
FIG. 6 shows a security device implemented between a data source and encrypted data storage using an in-line configuration, according to one embodiment.

FIG. 6 shows security device 102 implemented between a data source 604 and encrypted data storage 204 using an in-line configuration, according to one embodiment. In one example, security device 102 is installed as an enterprise high-performance data storage encryption and authentication appliance. The security device is installed as in-line (bump in the wire) between the data storage arrays. Security device 102 also interfaces with management console 602 and external key manager console 603.

Figure 7:
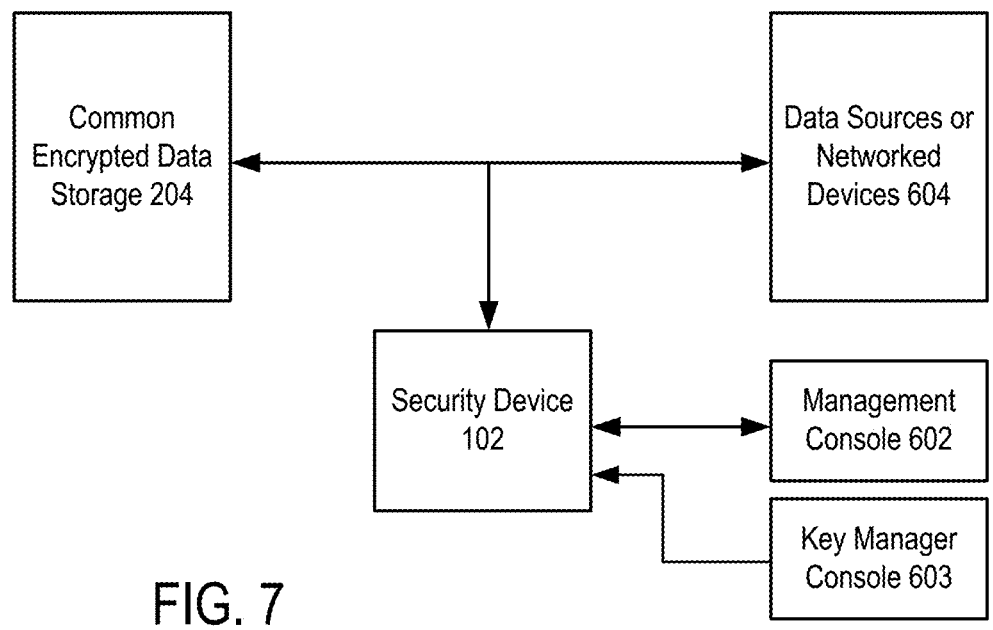
FIG. 7 shows a security device implemented between a data source and encrypted data storage using a side-car configuration, according to one embodiment.

FIG. 7 shows security device 102 implemented between data source 604 and encrypted data storage 204 using a side-car configuration, according to one embodiment. In one example, security device 102 is installed as a data storage encryption and authentication appliance as side car (off to the side of the data storage). Security device 102 also interfaces with management console 602 and external key manager console 603.

Figure 8:
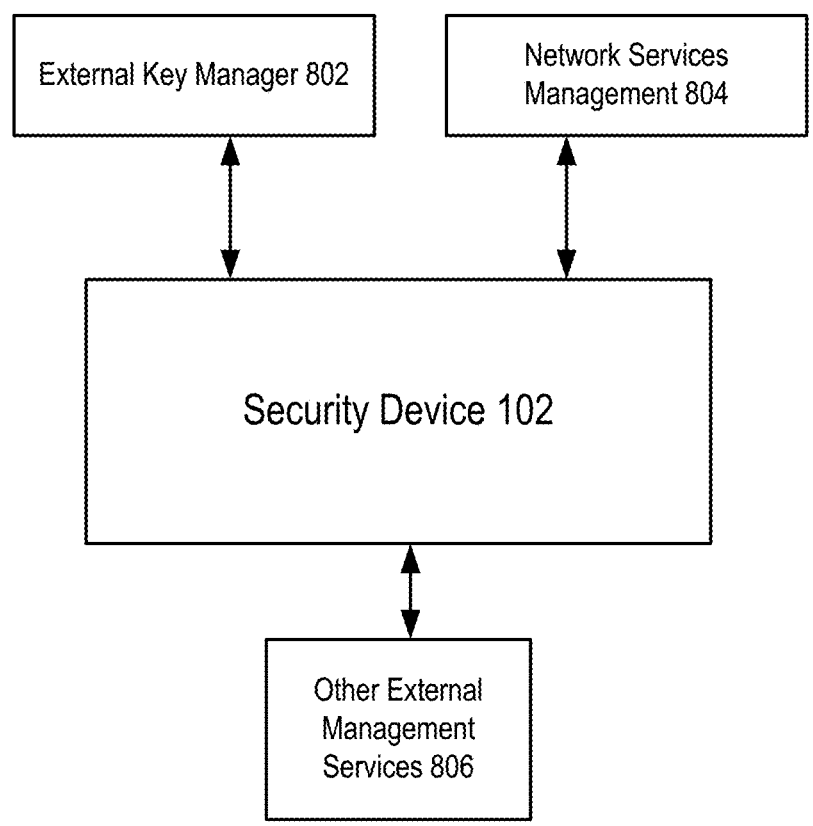
FIG. 8 shows a security device interfacing with external and network services, according to one embodiment.

FIG. 8 shows security device 102 interfacing with external and network services, according to one embodiment. In particular, security device 102 is interfaced with a management console consisting of external key manager 802, network services management 804, and any other required external management services 806.

Figure 9:
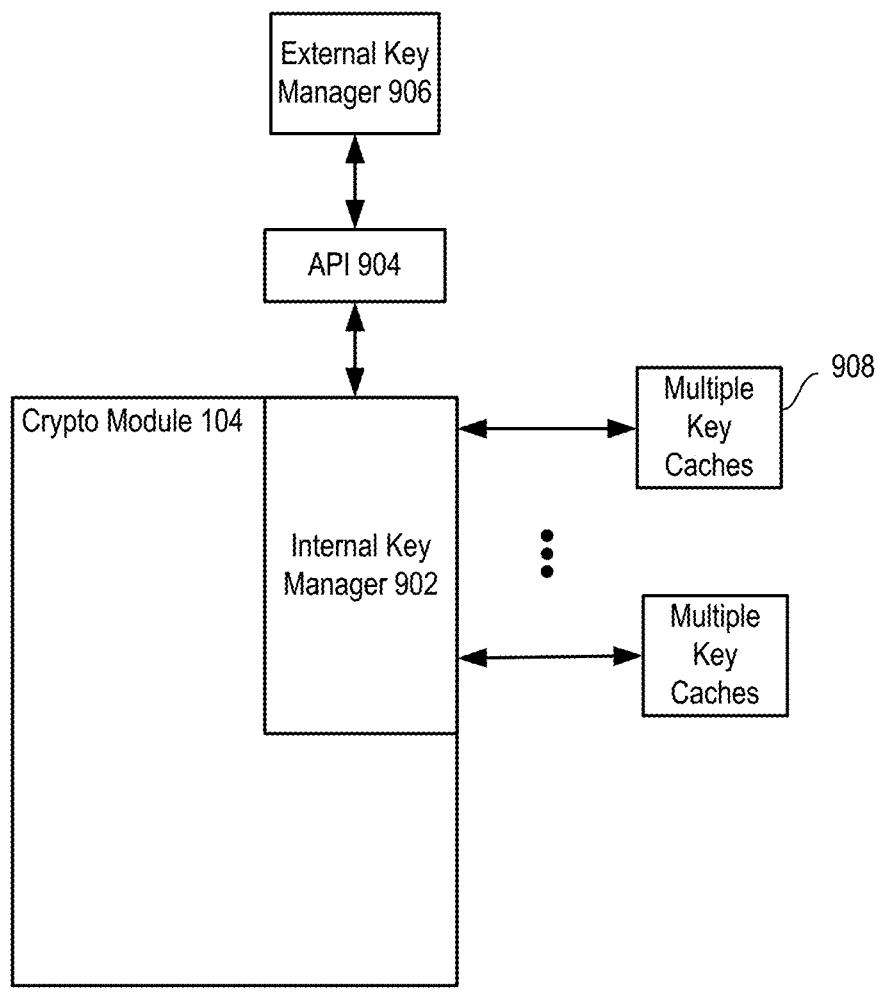
FIG. 9 shows an internal key manager of the cryptographic module that communicates with an external key manager via an application programming interface, according to one embodiment.

FIG. 9 shows an internal key manager 902 of cryptographic module 104 that communicates with an external key manager 906, according to one embodiment. Each of the plurality of cryptographic modules 104 comprises internal key manager 902, which is coupled via an application programming interface (API) 904 to external key manager 906. Keys received via API 904 are stored in one of multiple key caches 908 for use by the cryptographic modules 104 during encryption or decryption of incoming packets. In one embodiment, control plane processor 210 controls loading of the keys from API 904 to one of key caches 908.

In one embodiment, each of the incoming packets to a cryptographic module 104 includes a key tag to identify at least one key associated with the packet to be security processed, and further may also include a source tag to identify a data source and keys for the packet. The internal key manager 902 is configured to retrieve the keys from one of key caches 908 using the key tag for the packet to be processed by the respective cryptographic module 104.

In one embodiment, programmable input/output interface 106, 206, and/or 208 is further configured to route a packet to one of the plurality of cryptographic modules 104 based on the source tag.

In one embodiment, each of the plurality of cryptographic modules 104 may be physically partitioned from the other of the cryptographic modules. In one embodiment, other key features of security device 102 may include the ability to interface or port third party key management software and network management software.

Various additional, non-limiting embodiments of security device 102 are now described below. In one or more embodiments, security device 102 may provide one or more of the following advantages:

1. A fast data rate encryptor at hundreds of gigabits full duplex (e.g., for meeting future optical network data rates).

2. A programmable systolic architecture consisting of FPGAs and CPUs. The security device is flexible and programmable requiring only software upgrades for different versions and features.

3. Multi-tenancy to secure an entity's or individual user's data. Each entity/user's data will be encrypted/decrypted using a unique key per the entity/user. In this way, each entity/user's data will be uniquely encrypted/decrypted and stored in a common data storage area. If by operator or machine error the wrong data is accessed and mistakenly sent to another of the entity/users using the storage area, the data is still safe since it will not be decrypted by the correct entity/user key. Various embodiments for a multi-tenancy architecture are discussed below in the section titled "Multi-Tenancy Architecture".

4. A multi-level security architecture to secure different levels of classified data using a single security device (e.g., an encryptor). Each classification of data will be encrypted/decrypted using a unique key per the data class. In this way, each classification of data will be uniquely encrypted/decrypted and stored in a common storage area. If by operator or machine error the wrong data is accessed and mistakenly sent to another level of classification, the data is still safe since it is not decrypted by the correct user key.

5. A high-speed key agility and storage for millions of keys.

6. A flexible high-density I/O to interface to network equipment at multiple customer (or other source) sites. Also, the flexible I/O can be programmed for mixed interface types (e.g., 10 Gbs Ethernet, Infiniband, or PCI-express), thus requiring no interface bridging network equipment.

7. A replaceable, flexible I/O physical panel that can be customized for a specific network installation without the need to re-design the main chassis of security device 102.

8. A secure boot to protect, authenticate the CPUs, FPGAs firmware and software (SW) codes.

Figure 10:
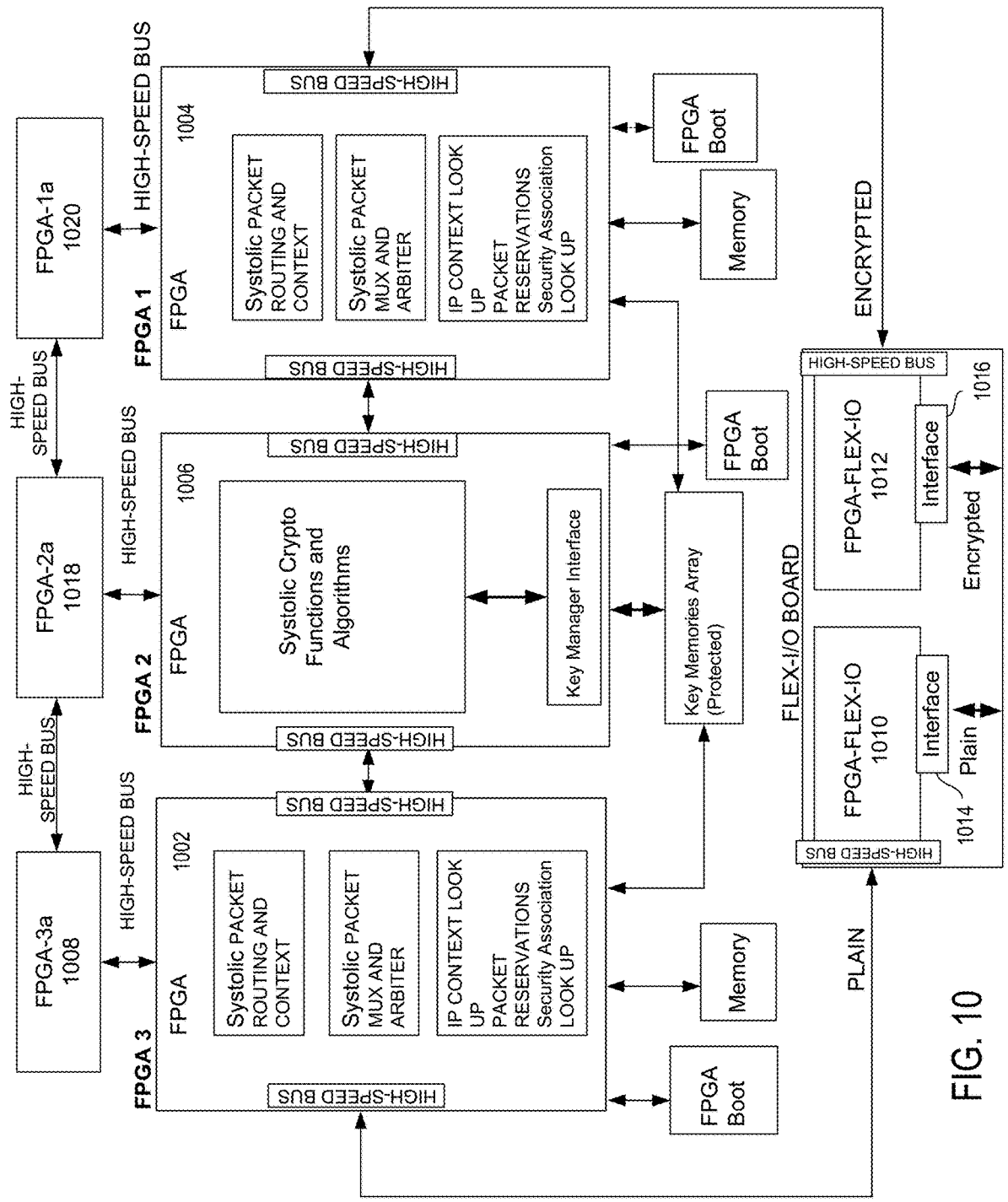
FIG. 10 shows a specific implementation of a programmable cryptographic module configured as a systolic array of FPGAs, according to one embodiment.

FIG. 10 shows a specific implementation of a programmable cryptographic module configured as a systolic-matrix array of FPGAs, according to one embodiment. In particular, the system of FIG. 10 is an exemplary implementation of cryptographic module 104 as was discussed for FIG. 3 above.

Specifically, un-encrypted or plain text data (e.g., incoming data packets) enters physical interface 1014 and is routed by programmable input interface 1010 to packet input engine 1002. Data packets are routed by input engine 1002 to an appropriate cryptographic core in cryptographic processing engine 1006.

A security association (SA) key lookup is used in packet engine 1002 or 1004 to determine appropriate keys for loading from a key memories array to cryptographic engine 1006 via a key manager interface or as defined in the packet header. These keys are used for security processing of the corresponding data packet.

After encryption by processing engine 1006, encrypted packets are provided to packet output engine 1004 for routing to programmable output interface 1012. The encrypted data leaves via physical interface 1016.

Programmable interfaces 1010 and 1012 may be formed using FPGAs or other programmable devices (e.g., as described above for I/O interfaces 106 or 208 of FIGS. 1 and 2). In one embodiment, physical interfaces 1014 and 1016 may form a part of interchangeable physical input/output interface 108. In one embodiment, physical interface 108 is implemented as a removable physical card.

In one embodiment, FPGAs 1008, 1018, and 1020 form a portion of the systolic-matrix array configuration illustrated in FIG. 10 and may be coupled to the packet input and output engines and cryptographic processing engine using serial buses. The packet input and output engines and cryptographic engine are formed using FPGAs to provide a two-dimensional systolic array of a top systolic layer. In one example, data and control processing is performed in two dimensions using the six FPGA units (e.g., FPGA 1008 and packet input engine 1002) as illustrated in FIG. 10.

In one embodiment, the sub-blocks in the packet input engine 1002 or packet output engine 1004 such as packet routing, packet multiplexer, and IP context lookup are implemented in a systolic-matrix array configuration as was discussed above. Data comes into the packet engine, and the packet engine looks at the packets, including the context, and decides where to route each packet. Then, the packet engine determines that a packet requires a particular security association, which is implemented using a key lookup. The packet engine associates the key to the incoming data. The key is read out, and the data is encrypted or decrypted in one of the crypto cores.

In one embodiment, high-speed memory is coupled to the input and output packet engines, and may be any type of high-speed memory in various embodiments.

In one embodiment, all primary processing works in a matrix. Data is constantly flowing in two dimensions. For example, data is flowing horizontally, keys are flowing up vertically, and control information is flowing down vertically as part of the two-dimensional processing.

Variations

Additional variations, details, and examples for various non-limiting embodiments of the above security processing system are now discussed below. In a first variation, with reference to FIG. 1, the programmable input/output interface 106 is a router/switch that selects one of the crypto modules 104 to receive forwarded packets. A router and switch are incorporated inside the input/output interface 106. For example, if a first packet comes through a second port, the first packet will be routed to crypto module number six. Crypto module number six will later route the first packet back out through that same second port of original entry.

There may be two components to the programmable I/O interface. On one side, the interface programs the type of I/O that is desired. The other side of the interface is the router/switch. The router/switch multiplexer knows which crypto module 104 is to receive a given packet. Also, the router/switch knows which crypto module is ready for processing of a packet. For example, if crypto module number one is ready for processing, it will flag itself as being ready for processing. For example, there is a semaphore flag or packet header bits used that tells I/O interface 106 which module is ready to process data. Whatever port is used to bring in the data, that data will be processed in one of the crypto modules, and then tagged out back to the same port when later being decrypted and sent out from storage (e.g., the packet is tagged with some identification of the port using a tag). The tag is used to redirect the packet back to the correct port of original entry.

The crypto module has a security association that determines which keys go with which packet. The programmable input/output may allow programming of different applications because of the use of FPGAs. The back end of the router/switch will accommodate the type of input/output to be used. The router/switch will identify the crypto module to be used. When reprogramming the programmable interface 106, a new physical interface needs to be interchanged or installed. The main security device chassis is not changed out—only the I/O portion is being changed.

In one embodiment, remote ports 112 are basically control ports. The protocol for the remote port may typically be a Simple Network Management Protocol (SNMP) protocol or any other management protocols The key fill port is where the keys are filled into the security device. The crypto ignition key ignites the security device.

With reference to FIG. 2, the Interbus serial bus (mentioned above) coordinates the operation of the two input/output interfaces 206, 218. The Interbus handles any protocol issues between the router and the switch functions of these interfaces. The Interbus is used to provide communication between the FPGAs of the systolic array during operation of the security device. In one example, the Interbus helps to coordinate operation as to which crypto module 104 will receive an incoming packet.

Processor 210 manages control plane operation. Processor 210 also configures components when a new security protocol will be used, uses routing tables, sets the configuration, sets up the programmability, and sets up the power-on self-test. Processor 210 also may facilitate key loading. The key fill port on the front of user panel 116 operates under control by processor 210.

With reference to FIG. 3, a secure boot is used to guarantee that the data booted into the FPGAs of the cryptographic module 104 is proper. The secure boot is executed when the unit is turned on or at boot-up. The code is authenticated by the system. The FPGAs are programmed at every boot up of the unit, or any time that the unit is reset. Each crypto module may have its own CPU which controls programming.

With reference to FIG. 8, external key management 802 is a location that the keys may be stored for passing to the security device 102. A network operator loads the keys into the external key management 802. The security device 102 loads the keys into the crypto modules. There is key tagging in the packet headers and inside the crypto module. When a packet comes into the security device 102, the packet is associated with a given key, and the packet contains information used to route the packet. The external key management can load keys in real-time or only a single time. Network services management 804 is remote management which provides control status, setting-up of the security device unit, and sending of the status back to a user. The other external management services 806 could be used to track how many other units are in the field, what the units are doing, whether each unit is running, and what configuration the unit is in.

In one embodiment, data packets include key tags, customer tags, and packet tags. The packet tag tells what type of packet is coming in. The customer tag identifies the company or source of the data. The key tag tells what key goes with what packet. Each tag is looked at by the packet engine to determine how the packet is going to be routed within the crypto module 104.

Now discussing an embodiment regarding flexible physical partitioning, each cryptographic module 104 may be physically isolated by design. So, only a certain packet will go through a module number one and only certain other packets will go through module number two. For example, crypto module number one may only process a certain style of packet. Crypto module number two may only process packets for a particular customer. Thus, it is physically partitioned. For example, customer number one's data is tagged as belonging to customer number one, for sending it to the specific crypto module. The router determines this requirement, and only that particular crypto module can process that customer's packet.

Regarding internal key management in the crypto module's performance, the key manager loads the keys, and further decides how the keys are dispersed within the crypto module based on the tagging of the incoming data packet.

Keys are stored in the selectable key cache 908. The key manager decides based on the tagging of the data packet what keys will be associated with the current packet. This provides key agility.

With reference to FIG. 9, API 904 may be programmed to map into any of several different external key managers 906. The use of API 904 thus provides increased flexibility.

Multi-Tenancy Architecture

Figure 11:
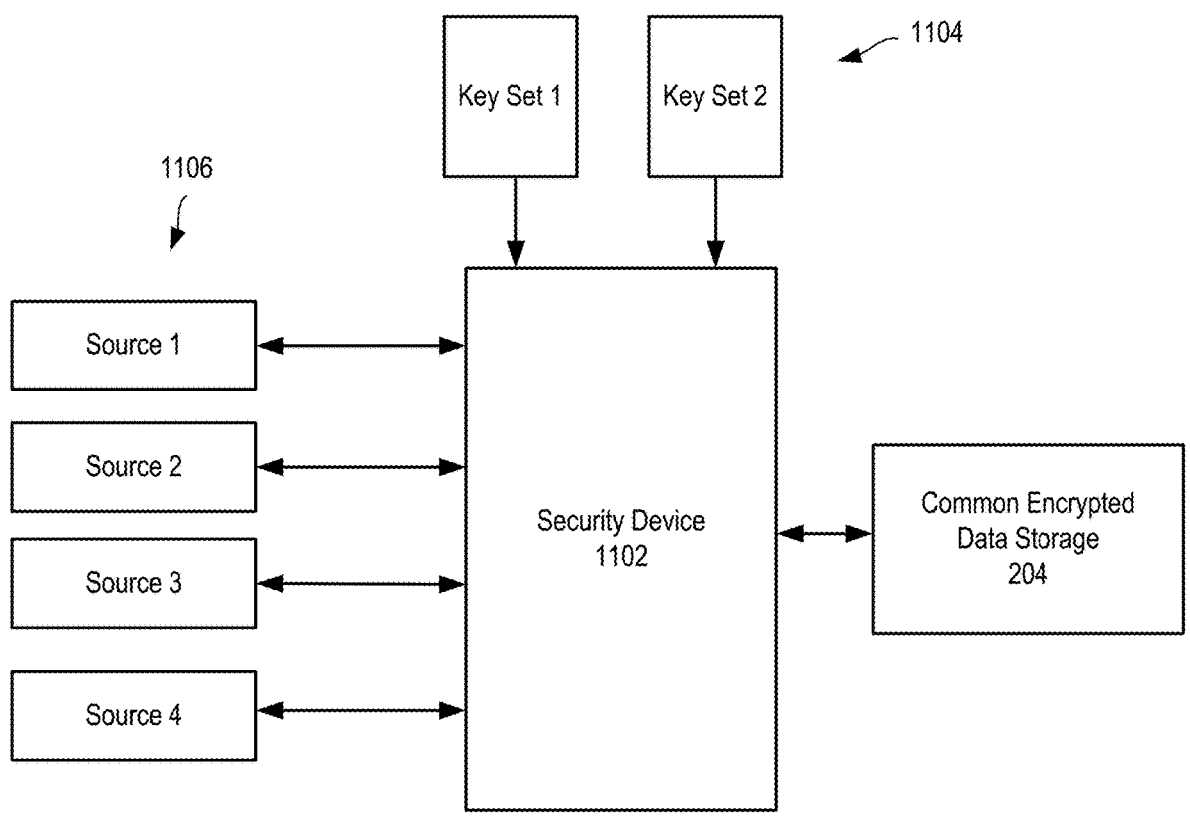
FIG. 11 shows a multi-tenancy system including a security device, according to one embodiment.

FIG. 11 shows a multi-tenancy system including a security device 1102, according to one embodiment. Security device 1102 is configured for cryptographic processing. Security device 1102 receives incoming data from a plurality of data sources 1106. For example, the incoming data includes first data from a first data source (Source 1). More specifically, the cryptographic processing includes encryption of data packets written to the common encrypted data storage 204, and decryption of data packets read from the common encrypted data storage 204.

A controller (not shown) is configured to select a first set of keys from a plurality of key sets 1104. Each of the key sets 1104 corresponds to one of the plurality of data sources 1106. The first set of keys (e.g., Key Set 1) is used by the security device to encrypt the first data. Common encrypted data storage 204 receives the encrypted first data from security device 1102.

The controller may be, for example, a key manager as discussed further below. In one embodiment, the security device 1102 includes the controller. In one embodiment, the controller is an internal key manager (e.g., as discussed above for FIG. 9 and internal key manager 902).

In one embodiment, the first data is a first data packet, and security device 1102 is configured to detect a tag of the first data packet that identifies the first data source (e.g., Source 1). The controller selects the first set of keys (Key Set 1) based on the detection of the tag.

Each of the plurality of data sources is typically located at a different physical location for a respective user (e.g., an entity such as a company or individual) using the common encrypted data storage 204 to store data sent over a network (e.g., the Internet or another communication link) to the security device 1102.

Figure 12:
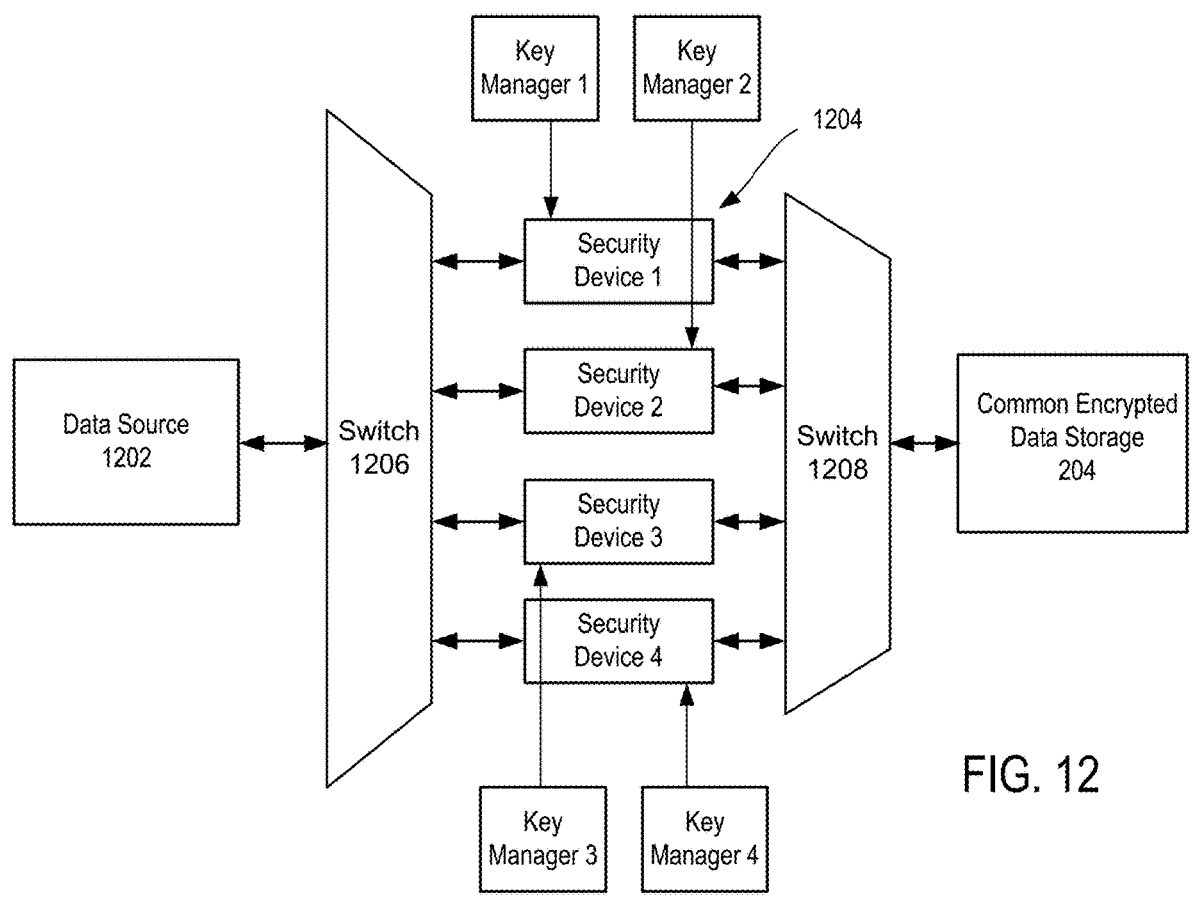
FIG. 12 shows a multi-tenancy system including multiple security devices and key managers, according to another embodiment.

FIG. 12 shows a multi-tenancy system including multiple security devices 1204 and key managers (Key Manager 1, 2, 3, 4), according to another embodiment. Each of the key managers may be, for example, an external key manager such as described for FIGS. 8 and 9 above.

Each of the security devices 1204 is configured for cryptographic processing and receives incoming data from at least one data source 1202. Each of the key managers is associated with a user (e.g., corporation or an individual). For example, a given user may control an external key manager that provides keys to one of the security devices 1204 for cryptographic processing of that user's data. A switch 1206 receives the incoming data from data source 1202 and routes the incoming data to one of the security devices. For example, switch 1206 may route the data to the security device that corresponds to the user that sent the data for storage.

Each key manager is coupled to a respective one of the security devices 1204, and each key manager is configured to provide a set of keys to a particular security device 1204 for encryption of incoming data associated with the respective user. The incoming data is then stored in common encrypted data storage 204 after the encryption.

Switch 1208 is used to route the encrypted data from the security device to encrypted data storage 204. When data is read from common encrypted data storage 204, switch 1208 routes the data to the appropriate security device 1204 for decryption processing.

In one embodiment, security devices 1204 include a first security device (Security Device 1). The key managers include a first key manager (Key Manager 1). The first security device comprises a key cache (not shown) configured to store a first set of keys (e.g., Key Set 1 as shown in FIG. 11) that are received from the first key manager. The first set of keys is loaded into a cryptographic core (not shown) of the first security device and then used to encrypt data packets in the incoming data.

Figure 13:
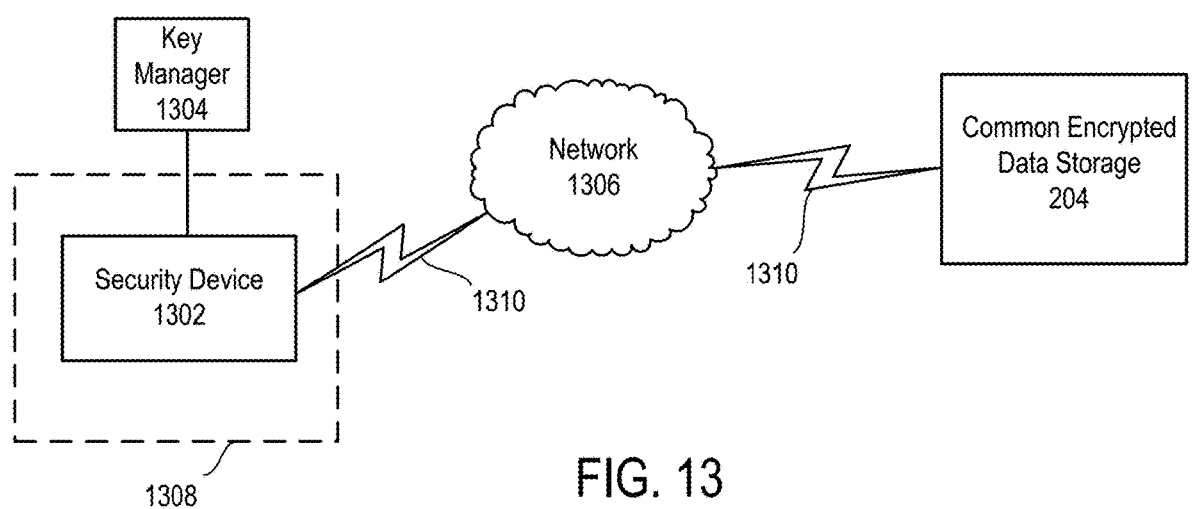
FIG. 13 shows a security device in communication over a network with a common data storage, according to one embodiment.

FIG. 13 shows a security device 1302 in communication over a network 1306 (via communication links 1310) with common data storage 204, according to one embodiment. In this embodiment, the controller discussed for security device 1102 above is an external key manager 1304 that provides keys to the security device 1302 via an application programming interface (as was discussed for FIG. 9 above). In one embodiment, the first data source 1106 of FIG. 11 corresponds to a first user, and external key manager 1304 receives commands from this first user to control access to the first set of keys by the security device 1302.

In FIG. 13, security device 1302 is shown located at a physical location or site 1308 of the first user. In other embodiments, security device 1302 may be located at the physical location of common encrypted data storage 204. In these other embodiments, key manager 1304 may still remain at physical location 1308 under the control of the first user.

Figure 14:
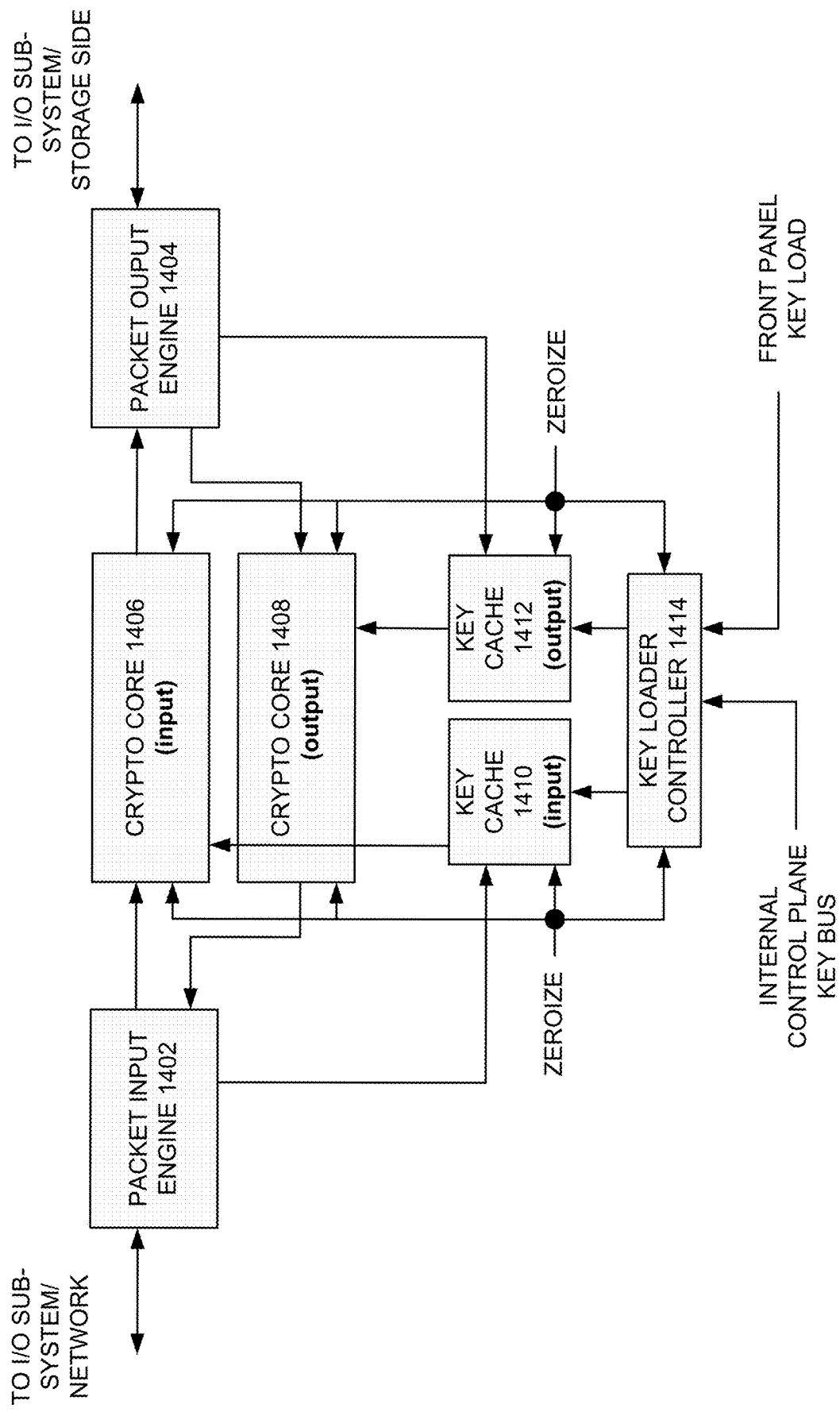
FIG. 14 shows a block diagram of a multi-tenancy cryptographic module including cryptographic cores and key caches, as used in a multi-tenancy architecture according to one embodiment.

FIG. 14 shows a block diagram of a multi-tenancy cryptographic module including cryptographic cores 1406, 1408 and key caches 1410, 1412, as used in a multi-tenancy architecture according to one embodiment. The cryptographic module is, for example, included in security device 1102 of FIG. 11, or in one or more of security devices 1204 of FIG. 12. Cryptographic core 1406 is an input core configured to perform encryption for data packets received from packet input engine 1402. Cryptographic core 1408 is an output core configured to perform decryption for data packets received from packet output engine 1404.

Input key cache 1410 and output key cache 1412 each store a plurality of key sets. A first set of keys is selected from the key sets stored in key cache 1410 to encrypt a first data packet by the input core 1406. Packet input engine 1402 is configured to detect a header of the first data packet and to address the first set of keys. In one embodiment, the cryptographic module includes a processor (not shown) configured to verify that the packet input engine 1402 is authorized to address the first set of keys.

The cryptographic module includes a key loader controller 1414 to load keys, for example, from an external key manager via an application programming interface. The key loader controller 1414 loads the first set of keys for storage in key cache 1410 prior to receipt of the first data packet by the cryptographic module. In one embodiment, key cache 1410 and key cache 1412 are each configured so that a key cache failure causes the respective key cache to be zeroized.

Stored keys are loaded into the appropriate cryptographic core 1406 or 1408 from key cache 1410 or 1412. The packet input engine 1402 provides a signal (e.g., an addressing signal) used by input key cache 1410 to select the first set of keys for use by the cryptographic core 1406 in encrypting incoming data packets. Packet output engine 1404 addresses keys in key cache 1412 in a similar way for decrypting outgoing packets.

Packet output engine 1404 provides encrypted data packets from the input core 1406 when writing data to common encrypted data storage 204. Packet output engine 1404 detects a header of each data packet when reading from the common encrypted data storage 204 in order to address a set of keys in output key cache 1412 for decrypting each data packet by output core 1408. Output core 1408 provides the decrypted data packets to packet input engine 1402, which sends the data packets to one of data sources 1106 of FIG. 11.

In one embodiment, input key cache 1410 stores a set of keys for encryption and output key cache 1412 stores a set of keys for decryption. The cryptographic module is configured to zeroize input core 1406, the input key cache 1410, and key loader controller 1414 after encrypting the first data packet. Output core 1408, output key cache 1412, and key loader controller 1414 are zeroized after decrypting data packets read from common encrypted data storage 204.

In one embodiment, as described in more detail below, a secure multi-tenancy system is provided to encrypt a customer's data to minimize or avoid situations where data is mistakenly read by another customer. The system reduces the risk of unauthorized access to a customer's data.

The packet input engine 1402 performs header detections, or modifications, and will authenticate and associate the customer's data. Once the data is authenticated and identified, packet input engine 1402 will address the unique specific customer's key in input key cache 1410. The input key cache 1410 stores this customer's specific keys. The input key cache also has a fail safe and key authentication processor (not shown) to verify the packet input engine 1402 is authorized to address the keys within the input key cache.

Key loader controller 1414 loads and verifies keys and addresses from the packet input engine 1402. A fail safe feature of the input key cache 1410 and key loader controller 1414 is that any key cache failure will result in a zeroized key cache. The key loader controller 1414 and the respective input or output key cache is designed to ensure the proper key is associated with the data that will be encrypted or decrypted. The key controller and each key cache is designed to be fail safe, in that if there is any failure in the key controller or one of the key caches, the cryptographic module will fail to a known state and the data will not be compromised.

Each of the key caches is designed to store, for example, one or more millions of keys. In one embodiment, each key cache writes keys one way to its respective cryptographic core (i.e., input core or output core).

Packet output engine 1404 performs header detections, or modifications, and authenticates and associates the customer's data read from common encrypted data storage 204. Once the data is authenticated and identified, packet output engine 1404 addresses output key cache 1412. The output key cache 1412 operates similarly to the input key cache 1410, discussed above.

Each cryptographic core is an encryption/decryption engine to encrypt or decrypt the data from the packet input/output (I/O) engines discussed above. The keys are loaded from the respective key caches, as was discussed above.

In some embodiments, the multi-tenancy architecture detects the packet header and associates the keys that will be encrypted/decrypted. There is an option provided for the keys in the key cache to be encrypted using a key encryption key or to be un-encrypted. The multi-tenancy architecture is configured to provide selected encrypted data into common storage area 204 (e.g., for data storage or for internal network processing and use). In one embodiment, the multi-tenancy architecture authenticates the I/O packet engines to the associated encryption and decryption keys within the respective input or output key cache for simultaneous two-way data traffic. The system requires that data be encrypted with a set of keys associated to a specific customer's data.

The multi-tenancy architecture may have fail safe features to ensure in cases of failure that the multi-tenancy architecture will fail to a safe state. Each key cache may be coupled to a fail safe key loader controller to authenticate the packet engines and send the correct key addresses. The key cache may be fail safe with authentication. The cryptographic core may use fail safe features and key agility to process keys from the respective key cache and data from the input/output packet engine.

Additional variations, details, and examples for various non-limiting embodiments of the multi-tenancy architecture/system are now discussed below. In a first variation, data is coming in from many different customers. Data is stored in one large database and in an encrypted form. For example, a first company's key and a second company's key are each loaded into the multi-tenancy system. The first company's key is selected for processing the first company's data.

In another variation, no entity but the customer is able to see the keys of the customer. The customer controls the keys by interacting with the key manager discussed above. The customer's keys cannot be lost by a data storage center operator, and cannot be used by another company.

In one example, each customer owns its own security device unit and controls and manages its own key manager. The other equipment of the data storage center can be commonly owned and operated by the data storage center operator. Each customer's security device unit is installed at the data storage center or at the customer's physical location.

In one variation, the internal control plane key bus as illustrated in FIG. 14, provides user or operational keys into key loader controller 1414. The front panel key load as illustrated in FIG. 14 is used to load keys from a key loader into the key loader controller 1414.

Multi-Independent Level Security (MILS) Mobile-Tactical Secure Data Storage

For commercial or military or government centric intelligence systems, there is need for a multi-independent level secure (MILS) storage encryption solution to encrypt and store different classified data to a "flat" encrypted data storage structure. Current U.S. Department of Defense (DoD) doctrine requires physically isolated, protected data storage facilities for each level of classified data. This is a secure method to store data, but is also costly. In addition, sharing information across domains (transfer of data between classification levels) is slow and cumbersome, which can hamper effectiveness and risk lives of people, depending on the particular information.

In one embodiment, a MILS storage encryption computing device is used with isolated input/outputs using independent encryption engines with a single encrypted data output to a flat data storage array or site. The MILS isolated input/outputs can be connected to a secure viewer platform where each domain of information is shown on the display. In one embodiment, this approach is extended to a full-trusted electronic cross domain solution that moves information between classified levels with minimal delay.

Various embodiments below describe computing systems for a mobile MILS data approach. Some embodiments also describe secure methods to transfer storage data over the Internet or other network (e.g., cloud).

In one embodiment, for classified applications, a DoD user builds four isolated, independent data storage networks, one for each classified level: Class1, Class2, Class3, and Class4. Having four data storage networks is costly in terms of space, training, resources and yearly operational cost. To enforce isolation, typically there is no network connection between the classified domains; the only way to share or move information is, for example, via CD ROM disks. Due to physical isolation, an operator can never monitor multiple domains simultaneously.

Figure 15:
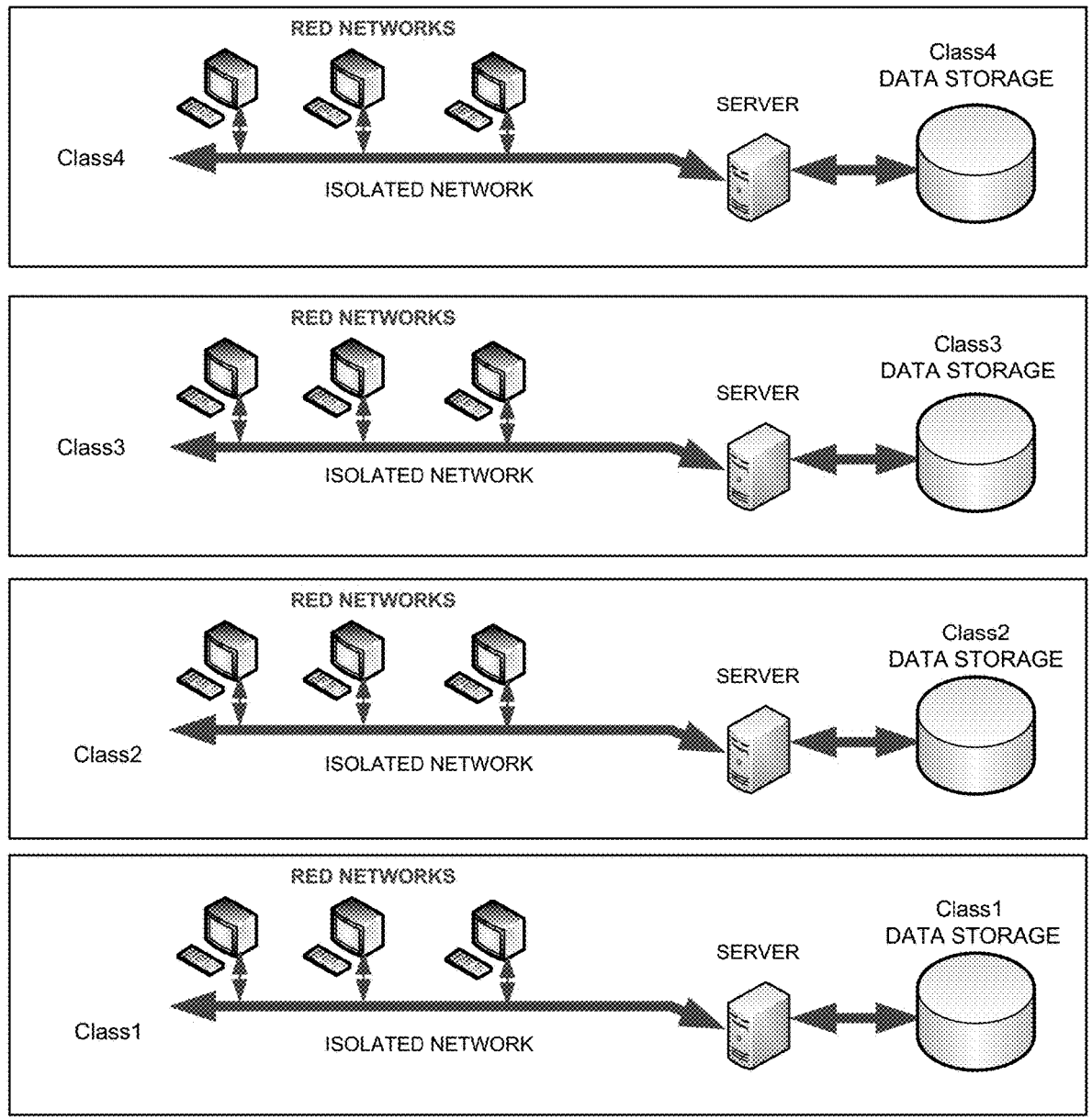
FIG. 15 shows physically-isolated classified domains.

Such an isolated approach, for example as illustrated in FIG. 15, is not scalable or practical in a mobile application with limited space, power and for which it may be imperative to share classified information.

Figure 16:
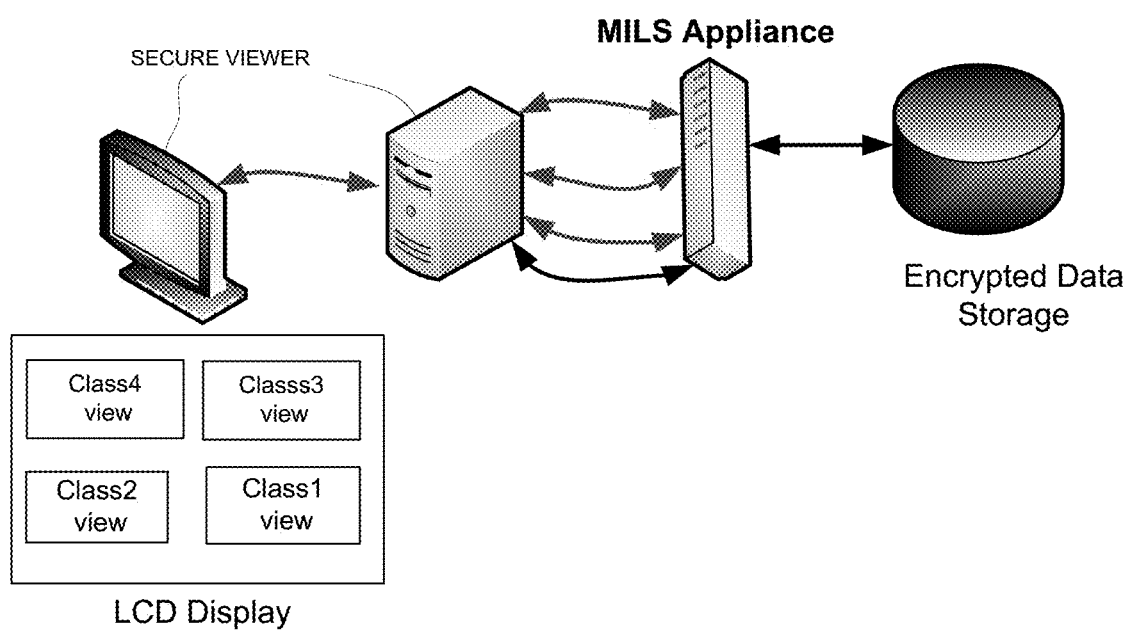
FIG. 16 shows a mobile MILS appliance system, according to one embodiment.

In one embodiment, an alternative classified data sharing is now described. An alternative secure mobile data sharing or multi-independent level security (MILS) approach according to this embodiment is shown in FIG. 16. This embodiment includes three components:

1. Commercial off-the-shelf (COTS) RAID or equivalent data storage device, for example with a 10 Gbs or 40 Gbs Ethernet interface. In other embodiments, a custom-designed RAID storage device can be used. In alternative embodiments, forms of data storage other than RAID may be used.

2. A MILS appliance with crypto modules (isolated from each other and isolated keys managers), and, for example, four isolated Ethernet interfaces: for classes (e.g., Class4, Class3, Class2, and Class1). The number of isolated interfaces may vary in other embodiments.

3. A secure viewer platform which displays the respective classified domains' information. This allows a user to monitor independent domains at the same time. In one embodiment, the secure viewer may be implemented on a personal computing device or mobile device of a user. In alternative embodiments, a viewer platform is not required.

In this embodiment, a secure MILS appliance is used to read to and write from the data storage device. For reading of data, the MILS appliance decrypts the requested data correctly (using the correct keys, for example selected as discussed above such as by using a security association lookup), and then routes the decrypted data to the correct classified port. For writing of data, the MILS appliance encrypts the data correctly (using the correct key based on the security level), and then sends the data to the encrypted data storage. The MILS appliance ensures that no data crosses between domains inadvertently.

In one embodiment, the secure MILS appliance is implemented using security device 102 discussed above.

Multi-Independent Level Security (MILS) Overview

Figure 17:
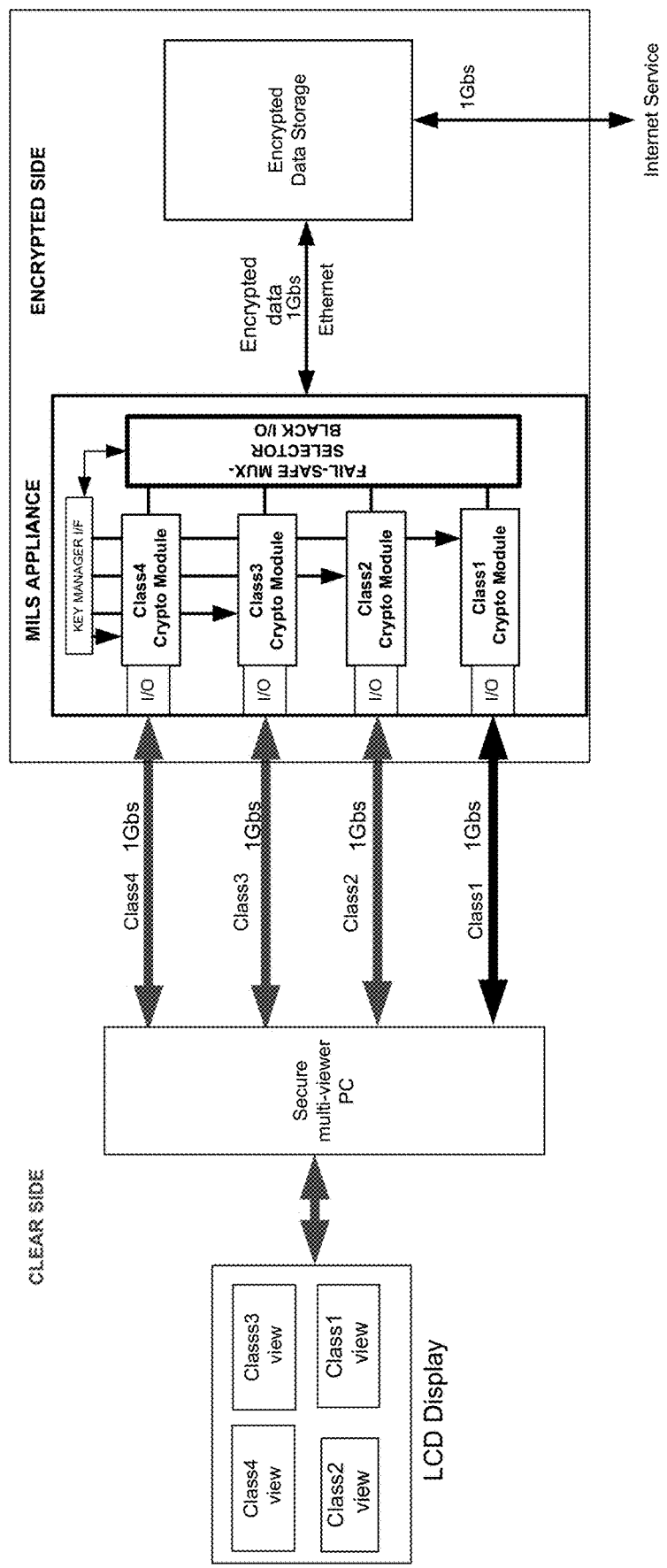
FIG. 17 shows a MILS appliance system block diagram, according to one embodiment.

In one embodiment, the MILS appliance consists of four independent, isolated crypto modules (e.g., cryptographic computing devices) with a fail-safe isolated key manager, which loads keys (one way) into the crypto module as shown in FIG. 17. The operational keys are loaded via a simple key loader device and stored within the MILS in an isolated key storage. The keys are stored securely and cannot be read back. All cipher keys are associated with a specific data storage area/security level. Each key is tagged with a specific security level.

For plaintext to ciphertext data, the storage destination location and encryption key associated with the data are verified against the security level of the physical network from which the packet was sent. For ciphertext to plaintext data, the storage area and decrypt key associated with the data are verified against the security level of the physical network the data is destined for. Data that fails the verification check are logged and discarded.

Verification is performed in a redundant, fail-safe manner. Each crypto module is connected to independent ports that are connected to their respective isolated network. The crypto module's encrypted outputs are connected to a fail-safe Mux Selector for write (encryption) operations to the data storage unit. The output of the Mux Selector is connected to an encrypted Ethernet port. For read operations, the fail-safe data—selector router will read the data storage unit and securely route the data to the correct crypto module for decryption. Internal fail-safe tagging based on the data storage source address is used to route the encrypted data to the correct security level module for decryption and the data's destination address will be verified against the security level of decryption before the data is allowed to be forwarded.

In one embodiment, this approach is NSA Government Off-the-Shelf (GOTS) certifiable based on each level of encryption module being isolated, and the fail-mux is a "black" processing element with fail safe design. In addition each red side interface is also isolated to its respective classified port.

Multi-Independent Level Security (MILS) Appliance Exemplary Details

In one embodiment, the MILS appliance will support four levels of security: Class4, Class3, Class2 and Class1. It should be noted that the number of levels of security can vary in other embodiments (e.g., 2, 3, 5 or more levels). Clients will be classified at a security level based on the physical or virtual port they are connected to. All keys will also be classified at a specific security level. The MILS appliance will ensure that information is processed at the correct security level by guaranteeing that clients at a specific security level do not access information on data storage with a higher security level. That is, a Class3 client cannot access information at a Class4 level, but can access information at a Class3, or lower level (e.g., classified or non-classified). The MILS appliance supports clients that are classified at different levels based on physical or virtual ports, depending on configuration, as discussed for certain embodiments below.

Physical Ports

In an embodiment for a configuration using physical ports, each security level will have its own physical port. The MILS appliance will determine the security classification for data written to the storage device based on the physical port that the packets are received on combined with access authentication. The MILS appliance will use internal tagging to provide fail-safe authentication and processing at the correct security level for the packet. For data being read from the storage device, the MILS appliance will tag the packet based on the security level of the key used to decrypt the data. Before retrieving data, the security level of the key will be validated against the security level of the requesting port. If the key passes validation, the MILS appliance will then determine the output port based on the destination IP address. If the tagging indicates a higher security level than the physical port, the packet will be discarded. This is a fail-safe redundant check due to the fact that the decryption key was also validated when the read command was processed.

Virtual Ports

In one embodiment, when clients at different security levels share a common physical network, virtual ports are created to differentiate each client's security level. Virtual ports may not be allowed in highly sensitive applications such as government classified data, but may be allowed in the applications with lesser separation requirements, such as sharing a common database with multiple tenants. The virtual port designation is communicated by an external tagging method, such as for example Ethernet VLAN tagging, defining VLAN IDs with a hamming distance of at least 2 for each security level or each different tenant (see Table 1 below).

For data being read from the device, the data will be handled in a similar way as described for the physical ports above, except the VLAN ID (or other external tag) will be selected based on the destination IP address, and will then be used to verify the security level of the internal tag.

Internal Tagging

In one embodiment, tagging is used inside the MILS appliance to ensure fail-safe handling of multi-level security packets. The tagging will be handled differently depending on the data flow direction of the packet, as described for various specific embodiments below.

Plaintext to Ciphertext Data Flow Direction

In one embodiment, if clients use separate physical networks based on different security classifications, the MILS appliance will tag the packet based on the physical port on which the packet is received by inserting tagging data (e.g., port number, class level) into the header or other meta data locations. If clients at different security levels are sharing a physical network, the MILS appliance tags the packet based on the external tag. The external tag is information that identifies the data origination (port) and class level, for example as shown in Table 1 below.

TABLE 1

Virtual Port Tagging

| Security Level | VLAN ID/Tag |
|---|---|
| Class4 | 0x81XXXXXX |
| Class3 | 0x42XXXXXX |
| Class2 | 0x24XXXXXX |
| Class1 | 0x18XXXXXX |

In all cases for the class level of data, it will perform the internal tagging by replacing the EtherType. An EtherType is a two-octet field in an Ethernet frame. It is used to indicate which protocol is encapsulated in the payload of the frame. For example, the field as shown in Table 2 below is an EtherType field that will replaced as shown in Table 3 also below.

TABLE 2

Internal Tagging, Security Level

| Port Security Level | EtherType (bits 7-0) |
|---|---|
| Class4 | 0x81 |
| Class3 | 0x42 |
| Class2 | 0x24 |
| Class1 | 0x18 |

TABLE 3

Internal Tagging, Mac Type

| Original EtherType Value | EtherType (bits 15-8) |
|---|---|
| 0x0800 | 0xF0 |
| 0x86DD | 0xF1 |
| 0x8870 | 0xF2 |
| 0x0806 | 0xF4 |
| 0x8100 | 0xF8 |

The EtherType will be encoded into the upper 8 bits of the EtherType so that it can be set to its original value before exiting the MILS appliance. The MILS appliance will determine the correct keys that are needed for each data encryption transaction and will verify that the security (class) level of the key does not exceed the security (class) level of the packet (based on the internal tagging) of the data/packets. This is considered a failsafe method to protect from associating the keys to a wrong class level. If the security level of the key does not exceed the security level of the packet, the EtherType will be restored to its original value prior to exiting the MILS appliance, and the packet will be sent to its destination. If the security level of the key exceeds the security level of the packet, the packet will be discarded.

Ciphertext to Plaintext Data Flow Direction

In one embodiment, the packets on the encrypted ciphertext side can share a physical network or could have individual networks for different security levels. FIG. 17 shows, for example, the encrypted data on the RAID (black) Data Storage side and the plaintext data (unencrypted) on the secure multi-viewer side of the MILS appliance. When processing the data read command, the MILS appliance will create a security context for the data that is to be retrieved from the RAID Data Storage device based on storage header (part of the data storage meta-data) information (security tag and key and data associations), which will be used to associate the returning data with its security tag and key.

The security level between the key and each of the secure multi-viewer ports (class 1-4) is verified prior to creating the context. The security level is verified again for each data packet before it is decrypted and sent to the plaintext network. Upon entering the MILS appliance, the EtherType will be modified as described above and internal tagging will provide fail-safe packet decryption according to the classification associated with the internal tag. The MILS appliance will verify the security level to ensure that it does not exceed the security level of the client, which is based on the physical or virtual port on which the client's packets are received by the data in the header (e.g., the port identified in storage header information for a packet as described above). If the security level is not exceeded, the EtherType will be restored to its original value and sent to the plaintext side network. Otherwise, the packet will be discarded.

Site-to-Site Cloud Data Transfer Using MILS Appliance

In one embodiment, the MILS appliance systems and methods above are extended to a mobile device embodiment. For example, a mobile device may be a portable unit that is hand-carried or installed on a mobile platform such as a land or air vehicle. In this embodiment, the stored data at Site A (e.g., consisting of multiple encrypted classified data at different class levels 1-4) is sent to another site (e.g., Site B), for example without the need for a VPN product or other device for transport security. An approach according to this embodiment is shown in FIG. 18.

Figure 18:
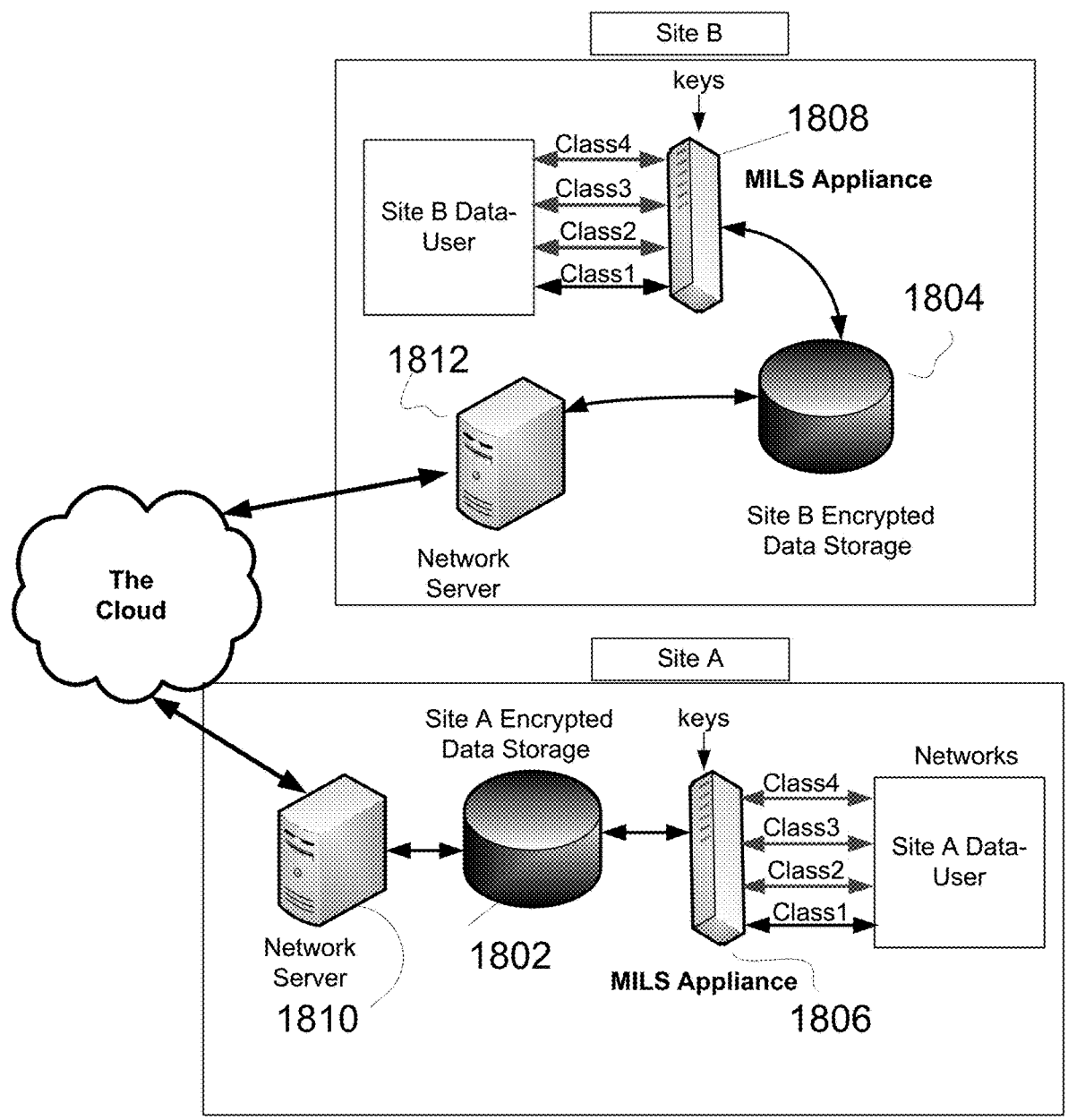
FIG. 18 shows secure sending of data over the cloud, according to one embodiment.

Site A has four classes of data sources: each data source is indicated as Class4, Class3, Class2 and Class1 in FIG. 18 and is connected to the MILS appliance 1806 at Site A. The MILS appliance 1806 encrypts packets for each of the four data sources as described above, and writes the encrypted data to the Site A encrypted data storage device 1802. The Site A data server 1810 stores encrypted data to/from the MILS appliance 1802.

The encrypted data will maintain its security level by the data tagging that contains the data class level and security key association (e.g., tagging as was described above). The Site B users can request to read the Site B encrypted data stored in data storage 1804 by using the MILS appliance 1808 (this encrypted data was received via network server 1812 from Site A). The MILS appliance 1808 reads the data from the Site B data storage 1804 and decrypts the read data based on the header information (e.g., class level and key association) and sends the clear data to the Site B user.

The Site B user can request to write to the Site B data storage 1804 via the MILS appliance 1808. The MILS appliance 1808 reads the data as provided on one or more ports from the Site B user, verifies the class level, associates the data to a class level, and encrypts the data. Next, the MILS appliance 1808 writes the encrypted data to the Site B data storage 1804.

By using this embodiment, classified data can be shared by off-site users (e.g., users at Site B) and the data is protected in transit by the same high level of security provided to the data at rest. If required, additional transport security of any level can be added during transit without any compromise of the original data's security level. One example is to use the industry SSL (Secure Socket Layer) or TLS (Transport Layer Security) to encrypt/decrypt the data sent between Site A and B.

In one embodiment, for a block-based encryption system (e.g., such as iSCSI), because the encryption is done on disk drive blocks and not individual files, the synchronization between Site A and Site B will be across the entire Site A and Site B data storage 1804 and 1802. The encrypted data storage 1802 is connected to a network server 1810 that reads or writes data to the Site A data storage 1802. The MILS appliance 1806 adds an authentication field for each block and sends the data and authentication field over the cloud (or other network) to Site B. The authentication field can be a digital signature or secure hash function that is inserted either in the data or in the data header.

The Site B network server 1812 receives the encrypted data plus authentication field and writes the encrypted data to the Site B data storage device 1804 if the authentication is successful.

In one embodiment, for a file-based encryption system (e.g., such as NFS or Samba), the MILS appliance 1808 or 1806 adds an authentication field to a data file. The authentication field is computed based on the data in the data file. For example, after encryption, the data and the authentication field are stored on the encrypted data storage device 1802 at Site A. The encrypted data storage 1802 is connected to network server 1810, which reads the requested files from Site A data storage 1802, and then the data file with authentication field is sent over the cloud to network server 1812 at Site B.

The Site B network server 1812 receives the encrypted data plus authentication field and writes the encrypted data to the Site B data storage 1804 (e.g., a drive) if the authentication is successful.

After Site A network server 1810 has transmitted the encrypted data from Site A to Site B, network server 1812 writes the data to data storage device 1804. The encrypted data is now available to Site B user. The Site B user can request to read from data storage 1804, and then the data will be decrypted by MILS appliance 1808 so the Site B user can read the data.

Figure 19:
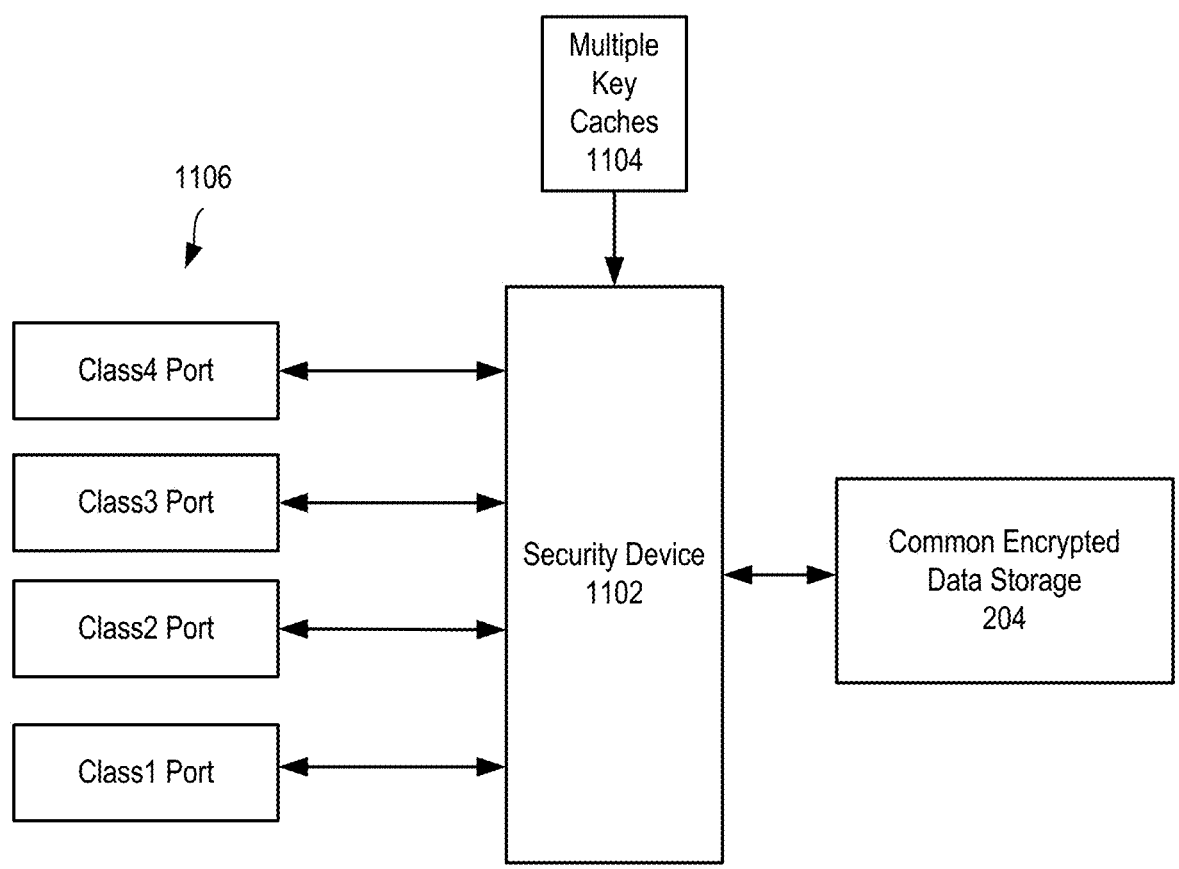
FIGS. 19-21 show a MILS appliance system according to various additional embodiments.
Figure 20:
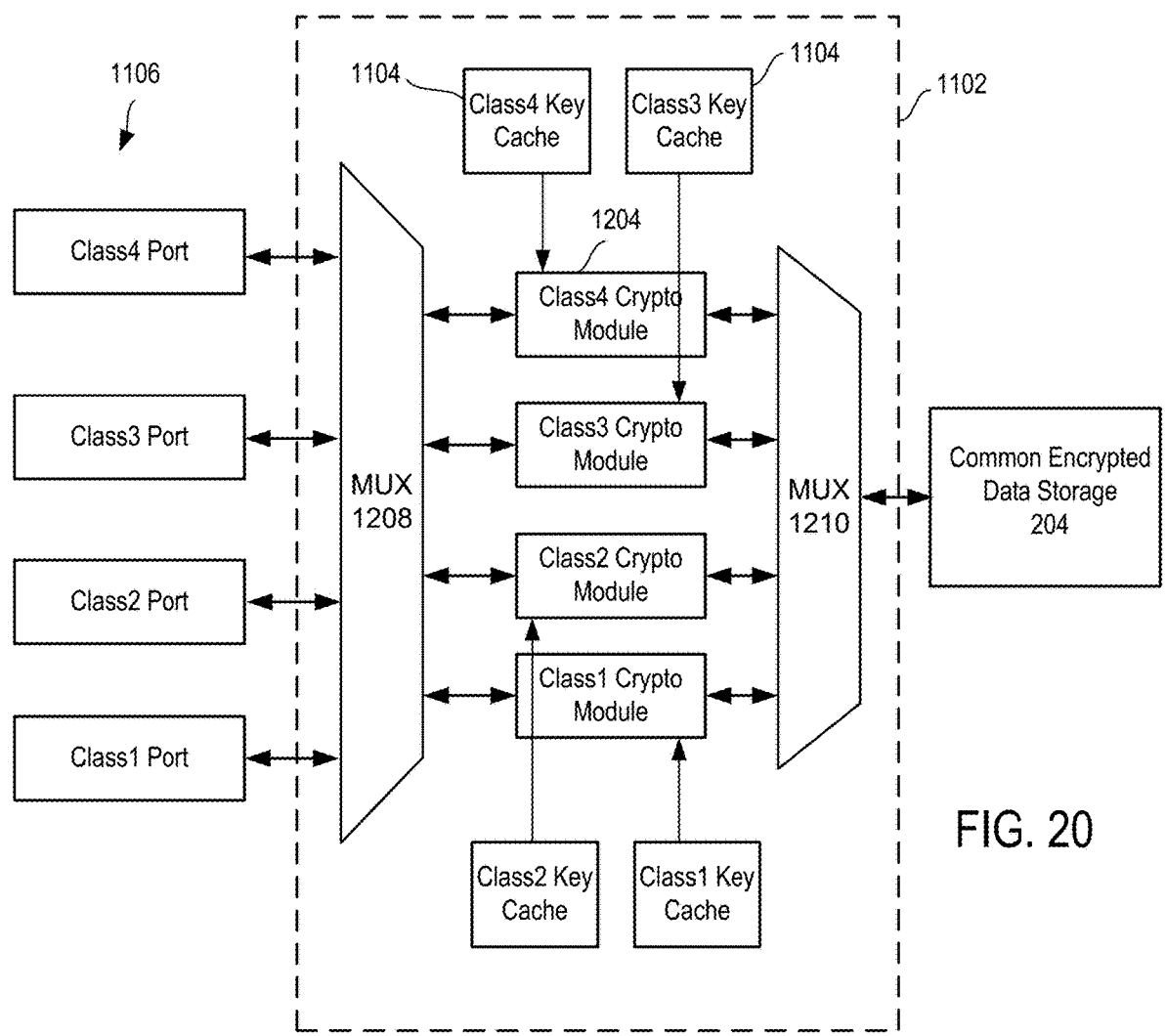
Figure 21:
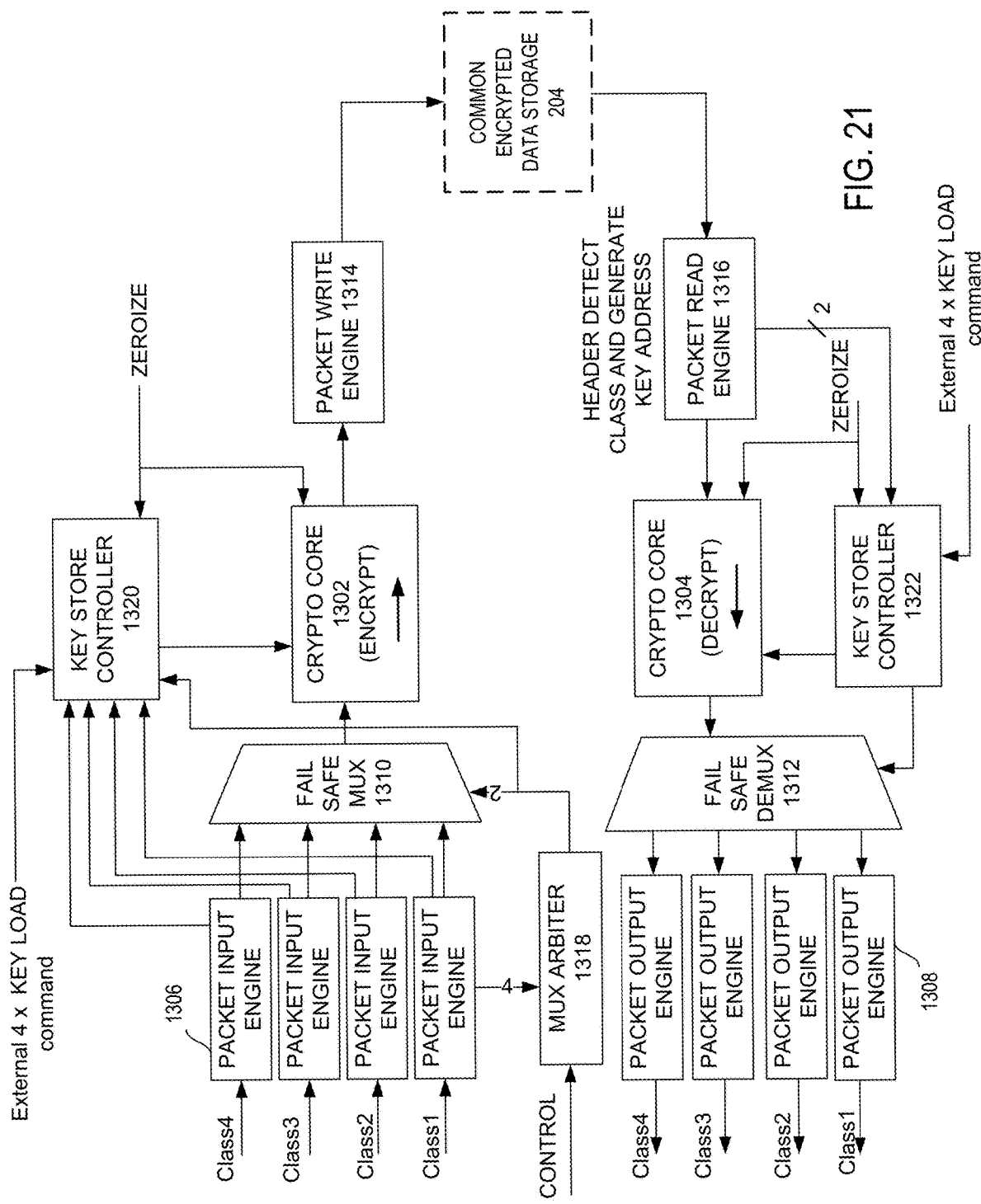

FIGS. 19-21 show a MILS appliance system according to various embodiments, where each system uses multiple class levels and is based on the MILS appliance structures and methods as discussed in the disclosure above.

In FIG. 19, security device 1102 is implemented using the MILS appliance discussed above.

In FIG. 20, each of crypto modules 1204 is provided in a MILS appliance as discussed above.

In FIG. 21, crypto cores 1302 and 1304 are provided in a MILS appliance as discussed above. Common encrypted data storage 204 in FIG. 21 corresponds to, for example, encrypted data storage 1802 of Site A above.

Closing

At least some aspects disclosed can be embodied, at least in part, in software. That is, the techniques may be carried out in a computer system or other data processing system in response to its processor(s), such as a microprocessor, executing sequences of instructions contained in a memory, such as ROM, volatile RAM, non-volatile memory, cache or a remote storage device.

In various embodiments, hardwired circuitry (e.g., one or more hardware processors or other computing devices) may be used in combination with software instructions to implement the techniques above (e.g., the communication system may be implemented using one or more computing devices). Thus, the techniques are neither limited to any specific combination of hardware circuitry and software nor to any particular source for the instructions executed by the data processing system.

In one embodiment, a computing device may be used that comprises an inter-connect (e.g., bus and system core logic), which interconnects a microprocessor(s) and a memory. The microprocessor is coupled to cache memory in one example.

The inter-connect interconnects the microprocessor(s) and the memory together and also interconnects them to a display controller and display device and to peripheral devices such as input/output (I/O) devices through an input/output controller(s). Typical I/O devices include mice, keyboards, modems, network interfaces, printers, scanners, video cameras and other devices which are well known in the art.

The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system such as the computing device above is used to implement one or more of the following: a security device, an encryption gateway, a router, a switch, a key manager, a client application, cloud storage, a load balancer, and a firewall.

In one embodiment, a data processing system such as the computing device above is used to implement a user terminal, which may provide a user interface for control of a computing device (e.g., a user terminal to control or configure a security device, or a user terminal to provide a secure viewer computing device, for example as illustrated in FIG. 16). In one example, a user interface may permit configuration of an encryption gateway. A user terminal may be, for example, in the form of a personal digital assistant (PDA), a cellular phone or other mobile device, a notebook computer or a personal desktop computer.

In some embodiments, one or more servers of the data processing system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) and/or the memory above. For example, the functionalities described can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Hardware and/or software may be used to implement the embodiments above. The software may be a sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

Software used in an embodiment may be stored in a machine readable medium. The executable software, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
receiving, by a first computing device on a first port of a plurality of ports, a data packet, wherein each of the ports corresponds to one of a plurality of security classes including a first security class that corresponds to the first port, and the first computing device comprises a plurality of cryptographic modules each dedicated to one of the plurality of security classes;
routing, based on at least one header, the data packet to a first cryptographic module of the plurality of cryptographic modules of the first computing device, the first cryptographic module of the first computing device being dedicated to the first security class;
encrypting the data packet using the first cryptographic module;
tagging the data packet using tagging data that identifies the first security class and the first port;
outputting the encrypted data packet to a first data storage;
transmitting the encrypted data packet from the first data storage to a second data storage;
receiving, by a second computing device, the encrypted data packet from the second data storage, wherein the second computing device comprises a plurality of cryptographic modules each dedicated to one of the plurality of security classes;
selecting, based on the tagging data, one of the plurality of cryptographic modules of the second computing device; and
decrypting, using the selected cryptographic module of the second computing device, the data packet.

2. The method of claim 1, further comprising:
selecting, based on the tagging data, one of a plurality of ports of the second computing device; and
providing the decrypted packet as output on the selected port of the second computing device.

3. The method of claim 1, further comprising loading at least one key for the encrypting by the first computing device of the received data packet, wherein the at least one key is selected based on a security class of the received data packet.

4. The method of claim 3, wherein the security class of the received data packet is determined by at least one header comprising security information.

5. The method of claim 1, further comprising replacing an external tag of the received data packet with an internal tag, wherein the internal tag includes at least one header comprising security information.

6. The method of claim 5, further comprising verifying, based on the internal tag, that a security class of a key does not exceed the first security class.

7. The method of claim 6, further comprising, in response to verifying that the security class of the key does not exceed the first security class, restoring a field associated with the data packet.

8. The method of claim 1, wherein the first port is a virtual port.

9. The method of claim 1, wherein the at least one header is an embedded data header or a meta-data header.

10. A system, comprising:
a first computing device including at least one processor or field-programmable gate array (FPGA); and
memory configured to instruct the at least one processor or FPGA to:
receive, on a first port of a plurality of ports, a data packet, wherein each of the ports corresponds to one of a plurality of security classes;
tag the data packet using tagging data that identifies a first security class of the security classes;
route the data packet to a first cryptographic module of a plurality of cryptographic modules each dedicated to a security class of the plurality of security classes with the first cryptographic module being dedicated to the first security class;
encrypt the data packet using the first cryptographic module; and
send the encrypted data packet to a first data storage, wherein the encrypted data packet is transmitted to a second data storage and retrieved by a second computing device therefrom, wherein the tagging data enables the second computing device to select one of a plurality of cryptographic modules dedicated to the first security class for decrypting the data packet.

11. The system of claim 10, further comprising a data storage device coupled to receive the encrypted data packet.

12. The system of claim 10, wherein the first port is a physical port.

13. The system of claim 10, wherein the data packet is routed to the first cryptographic module based on the tagging data.

14. The system of claim 13, wherein at least one header of the data packet comprises the tagging data.

15. The system of claim 10, wherein the tagging data further identifies the first port as an entry port.

16. The system of claim 10, wherein the memory is further configured to instruct the at least one processor or FPGA to, after encrypting the data packet using the first cryptographic module, restore a value associated with the tagging data.

17. The system of claim 10, wherein the memory is further configured to instruct the at least one processor or FPGA to, in response to verifying that a security class of a key does not exceed the first security class, restore a field associated with the data packet.

18. A system comprising:
a plurality of ports, wherein each of the ports corresponds to one of a plurality of security classes including a first security class that corresponds to a first port; and
at least one processor or field-programmable gate array (FPGA) configured to:
route a data packet received on the first port to a first cryptographic module of a plurality of cryptographic modules each dedicated to one of the plurality of security classes with the first cryptographic module being dedicated to the first security class;
encrypt the data packet using the first cryptographic module;
tag the data packet using tagging data that identifies the first security class and the first port; and
send the encrypted data packet to a first data storage, wherein the encrypted data packet is transmitted to a second data storage and retrieved by a computing device, wherein the tagging data is configured to enable the computing device to select one of a plurality of cryptographic modules dedicated to the first security class for decrypting the data packet.

19. The system of claim 18, wherein the tagging data is further configured to enable the computing device to select a port of the computing device for providing the decrypted packet as output.

20. The system of claim 18, wherein a key is used to encrypt the data packet, and the at least one processor or FPGA is further configured to verify, based on a tag of the data packet, that a security class of the key does not exceed the first security class.

\* \* \* \* \*